(12) United States Patent
Hirobe et al.

(10) Patent No.: US 11,765,287 B2
(45) Date of Patent: Sep. 19, 2023

(54) INFORMATION PROCESSING APPARATUS CAPABLE OF ALLOWING DISPLAY DEVICE TO DISPLAY COMBINATIONS OF SETTING VALUES SATISFYING PREDETERMINED CONDITION

(71) Applicant: KYOCERA Document Solutions Inc., Osaka (JP)

(72) Inventors: Yumi Hirobe, Osaka (JP); Takashi Namii, Osaka (JP); Yoichi Hiranuma, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/228,312

(22) Filed: Apr. 12, 2021

(65) Prior Publication Data

US 2021/0329136 A1  Oct. 21, 2021

(30) Foreign Application Priority Data

Apr. 21, 2020 (JP) ................................. 2020-075358
Apr. 21, 2020 (JP) ................................. 2020-075359

(51) Int. Cl.
*H04N 1/00* (2006.01)
*G06F 3/04855* (2022.01)
(Continued)

(52) U.S. Cl.
CPC ..... *H04N 1/00413* (2013.01); *G06F 3/04842* (2013.01); *G06F 3/04855* (2013.01);
(Continued)

(58) Field of Classification Search
CPC ............. G06F 3/04842; G06F 3/04883; G06F 3/04855; H04N 1/00413; H04N 1/00395; H04N 1/00411; H04N 1/00474
(Continued)

(56) References Cited

U.S. PATENT DOCUMENTS 9,607,250 B2 * 3/2017 Nakagawa ............ G06F 3/1284
2018/0220015 A1  8/2018 Akuzawa
(Continued)

FOREIGN PATENT DOCUMENTS

JP  2018-125686 A  8/2018
JP  2019-119139 A  7/2019

*Primary Examiner* — Sherrod L Keaton
(74) *Attorney, Agent, or Firm* — IP BUSINESS SOLUTIONS, LLC

(57) ABSTRACT

An information processing apparatus includes a display device, an operation device, a storage device, and a control device. The storage device stores combinations of setting values set in respective jobs previously executed in relation to each of a plurality of functions. The control device allows the display device to display at least one of respective first images representing the functions in a first region of a display area, reads out the combination of setting values satisfying a predetermined condition from the storage device, allows the display device to display a second image showing the read combination of setting values in a second region of the display area, and, upon acceptance of a touch gesture on the second image through a touch panel of the operation device, executes, according to the combination of setting values shown by the second image, a job related to the function associated with the second image.

7 Claims, 29 Drawing Sheets

(51) Int. Cl.
*G06F 3/04842* (2022.01)
*G06F 3/04883* (2022.01)

(52) U.S. Cl.
CPC ..... *G06F 3/04883* (2013.01); *H04N 1/00395* (2013.01); *H04N 1/00411* (2013.01); *H04N 1/00474* (2013.01)

(58) Field of Classification Search
USPC ........................................................ 715/764
See application file for complete search history.

(56) References Cited

U.S. PATENT DOCUMENTS

| | | | |
|---|---|---|---|
| 2018/0314474 A1* | 11/2018 | Nakaya | H04N 1/00832 |
| 2019/0379799 A1* | 12/2019 | Shogaki | H04N 1/00405 |
| 2020/0076970 A1* | 3/2020 | Chiba | G06F 3/1273 |

* cited by examiner

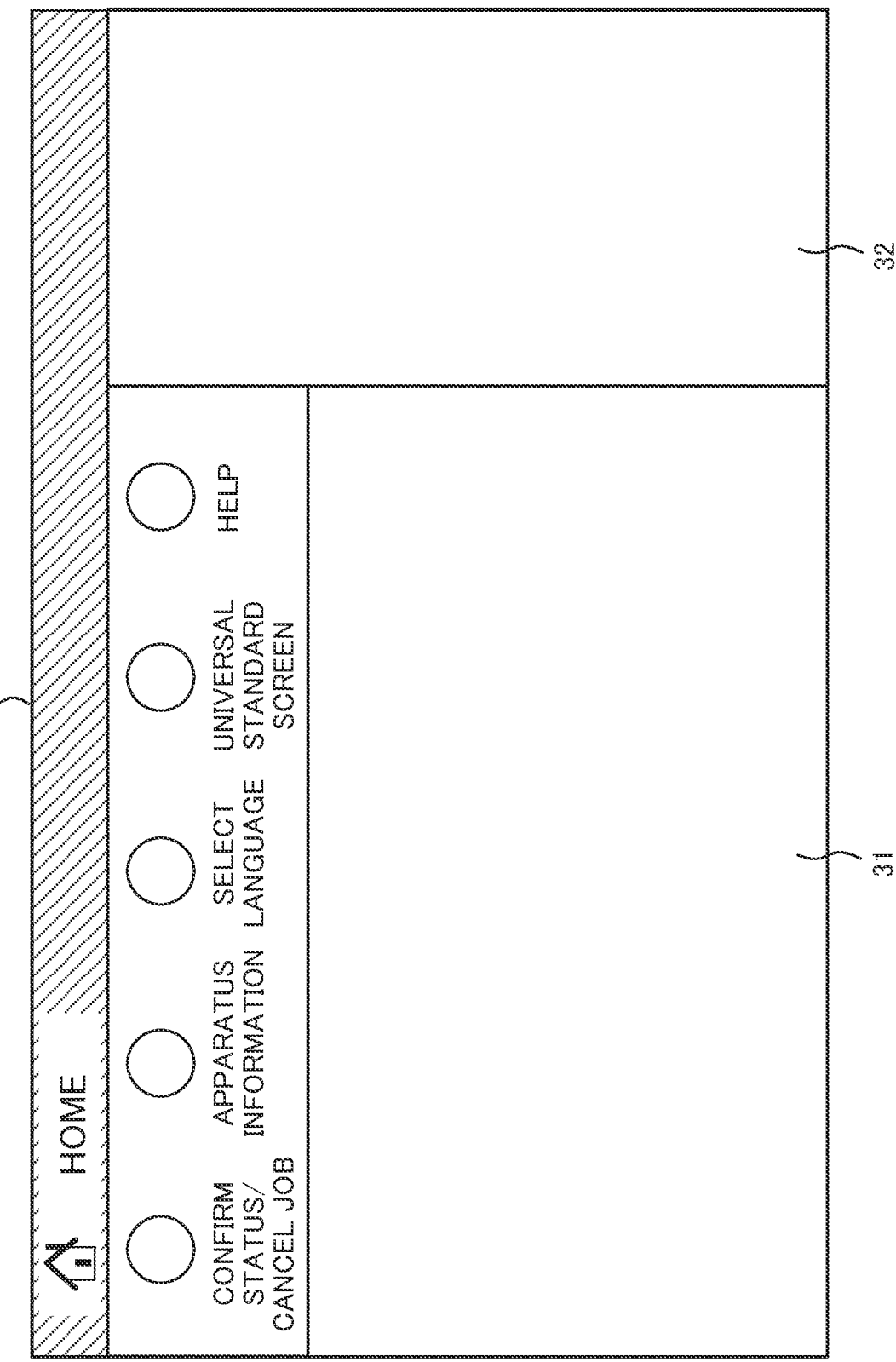

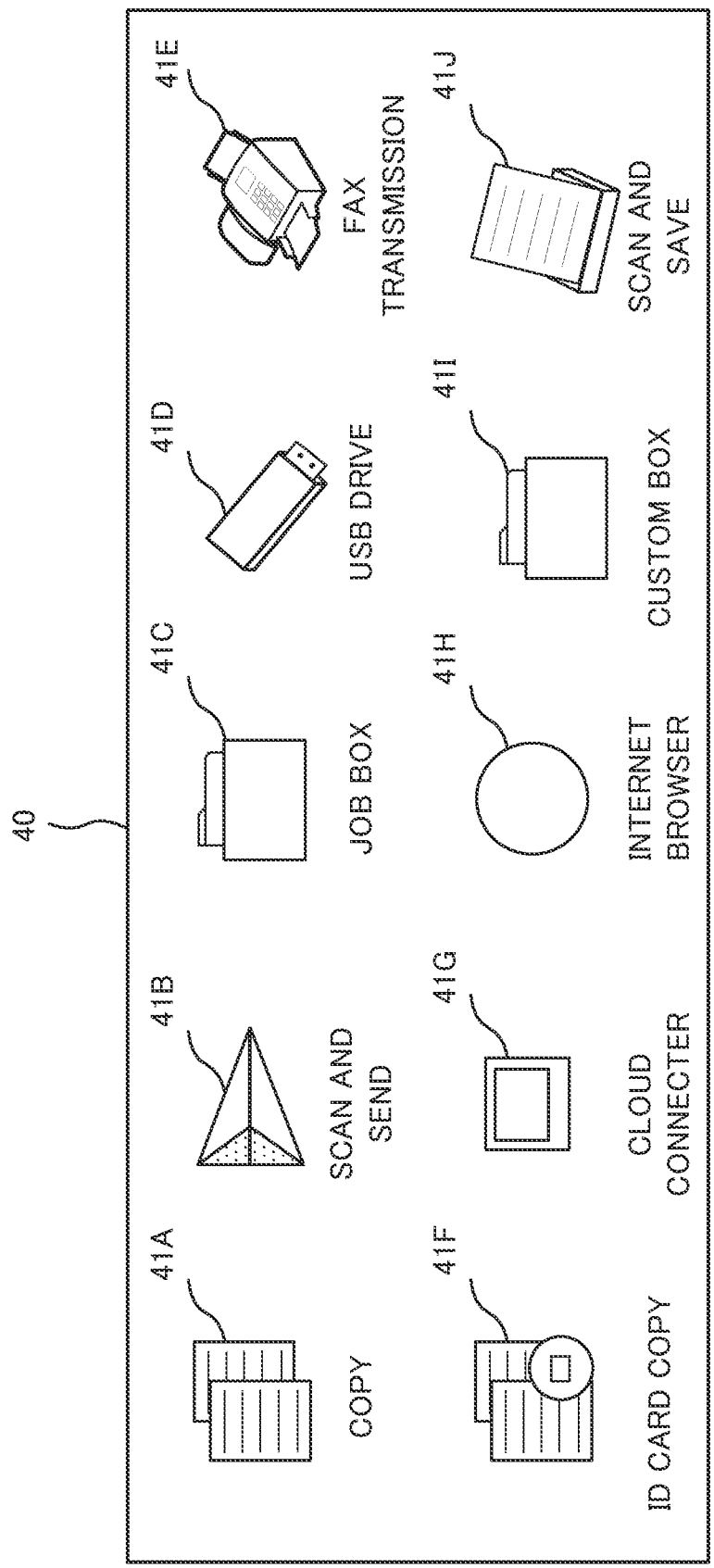

Fig.5A

| DATE | SETTINGS | | | | | |
|---|---|---|---|---|---|---|
| | COPIES | SHEET | MAG. | COLOR | AGGR. | ... |
| 2020/01/01 13:00:05 | 3 | AUTO | 100% | FULL | 1 IN 1 | ... |
| 2020/01/01 15:40:07 | 1 | A4 | 70% | B&W | 2 IN 1 | ... |
| 2020/01/01 17:53:02 | 4 | A3 | 100% | FULL | 1 IN 1 | ... |

| DATE | DESTN. | SETTINGS | | |
|---|---|---|---|---|
| | | ADDRESS | | ... |
| 2020/01/01 10:03:05 | ADAM | ABCD.EFG@COM | | ... |
| 2020/01/01 14:40:09 | JOHN | HIJK.LMN@COM | | ... |

| DATE | DESTN. | SETTINGS | |
|---|---|---|---|
| | | FAX NO. | ... |
| 2020/01/01 14:00:07 | LEO | 01-2345-6789 | ... |

| DATE | SETTINGS | | |
|---|---|---|---|
| | DESTN. TO SAVE | FORMAT | ... |
| 2020/01/01 17:03:05 | PQR¥STU | PDF | ... |

53A

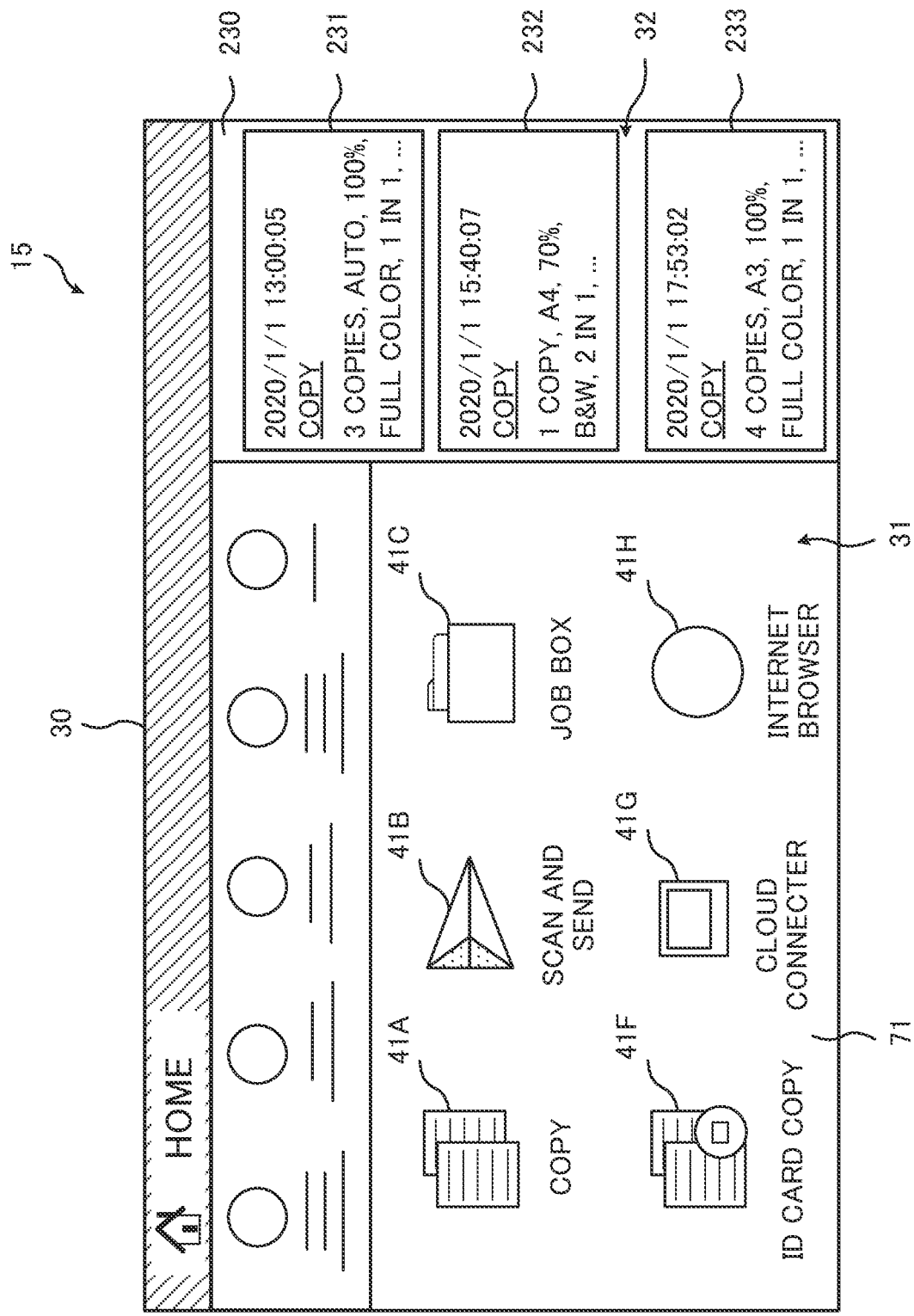

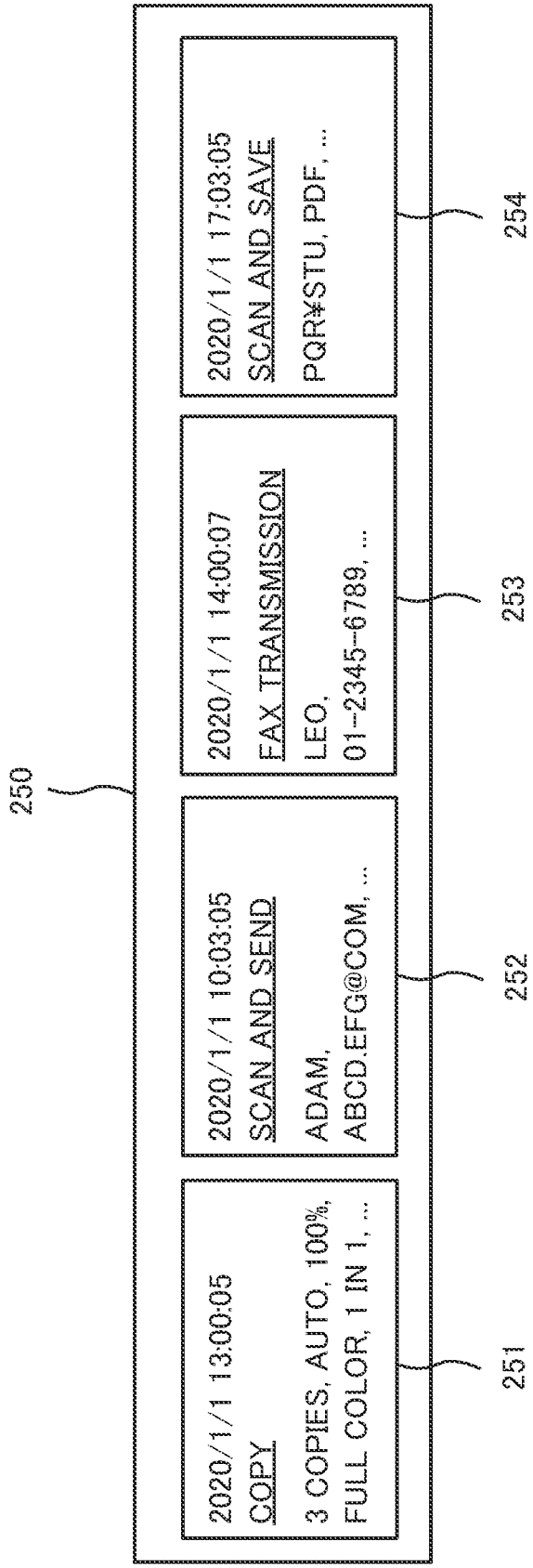

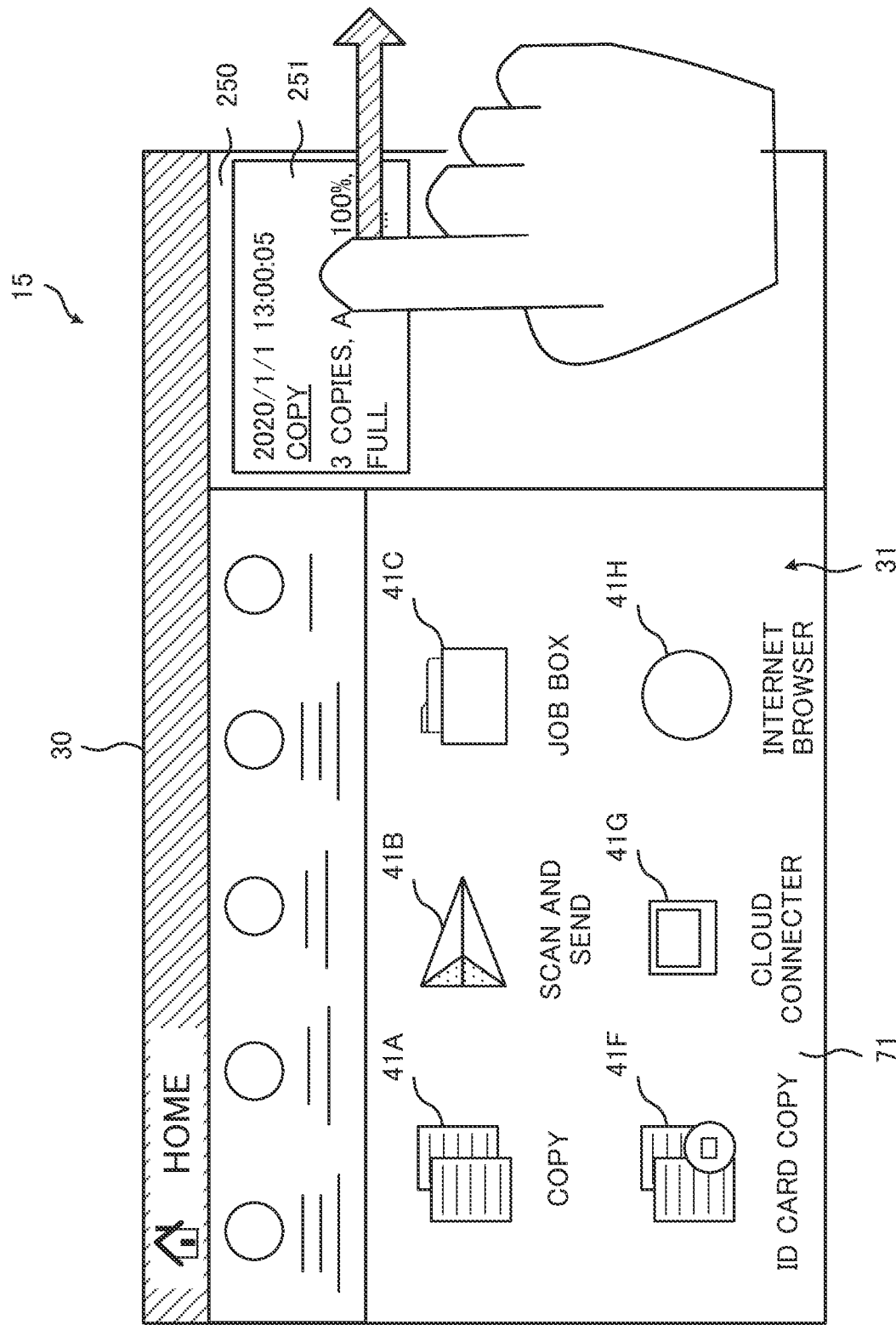

INFORMATION PROCESSING APPARATUS CAPABLE OF ALLOWING DISPLAY DEVICE TO DISPLAY COMBINATIONS OF SETTING VALUES SATISFYING PREDETERMINED CONDITION

INCORPORATION BY REFERENCE

This application claims priority to Japanese Patent Application No. 2020-075358 filed on 21 Apr. 2020 and Japanese Patent Application No. 2020-075359 filed on 21 Apr. 2020, the entire contents of which are incorporated by reference herein.

BACKGROUND

The present disclosure relates to information processing apparatuses and particularly relates to a technique for applying a combination of setting values set in a previously executed job to the next job.

There is known a technique for applying a combination of setting values set in a previously executed job to the next job. For example, a general technique is known in which respective application buttons representing a plurality of functions executable on an image forming apparatus are displayed in a predetermined region of a home screen, history buttons showing combinations of setting values set in previously executed jobs are displayed in another predetermined region of the home screen, and one of the combinations of setting values shown by the history buttons is accepted as values for use in the next job.

SUMMARY

A technique improved over the aforementioned technique is proposed as one aspect of the present disclosure.

An information processing apparatus according to an aspect of the present disclosure includes a display device, an operation device, a storage device, and a control device. The display device includes a display area. The operation device includes a touch panel provided on the display device and accepts an instruction from a user. The storage device stores combinations of setting values set in respective jobs previously executed in relation to each of a plurality of predetermined functions. The control device includes a processor and functions as a controller through the processor executing a control program. The controller allows the display device to display at least one of respective first images representing the plurality of functions in a predetermined first region of the display area, reads out the combination of setting values satisfying a predetermined condition from the storage device, allows the display device to display a second image showing the read combination of setting values in a predetermined second region of the display area different from the first region, and, upon acceptance of a touch gesture on the second image through the touch panel, executes, in accordance with the combination of setting values shown by the second image on which the touch gesture has been made, a job related to the function associated with the second image.

BRIEF DESCRIPTION OF THE DRAWINGS

FIG. 3 is a view showing an example of a home screen.

FIG. 4 is a view showing an example of a scrollable menu image for use in being displayed in a first region.

FIG. 5A is a view showing examples of combinations of setting values.

FIG. 5B is a view showing other examples of combinations of setting values.

FIG. 5C is a view showing still another example of a combination of setting values.

FIG. 5D is a view showing still another example of a combination of setting values.

FIG. 24 is a view showing still another example of a state where history buttons are displayed in the second region.

FIG. 25 is a view showing still another example of an image containing history buttons.

FIG. 26 is a view showing still another example of a state where a history button is displayed in the second region.

DETAILED DESCRIPTION

First Embodiment

Figure 1:
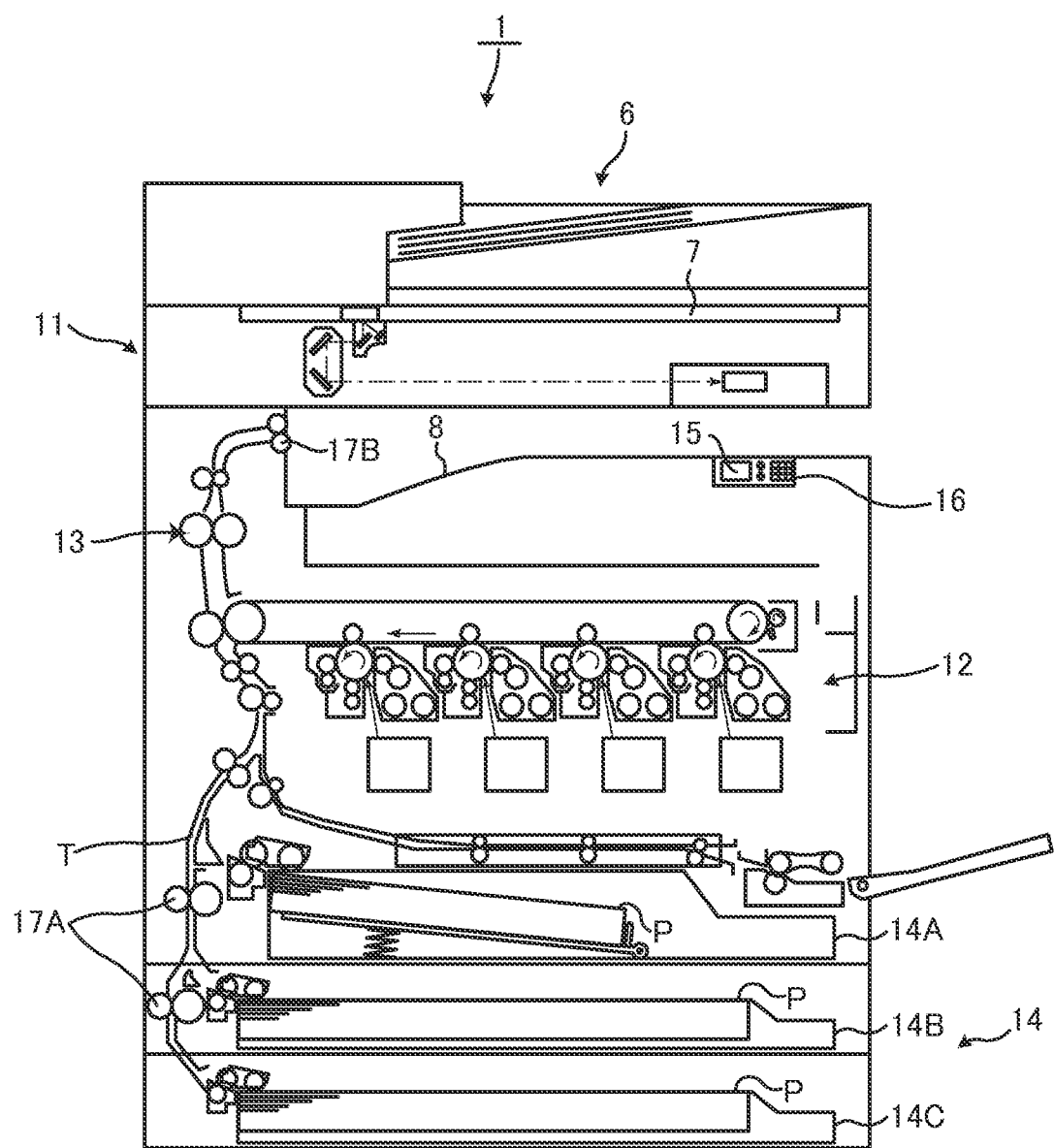
FIG. 1 is a frontal cross-sectional view showing the structure of an image forming apparatus according to one embodiment of the present disclosure.
Figure 2:
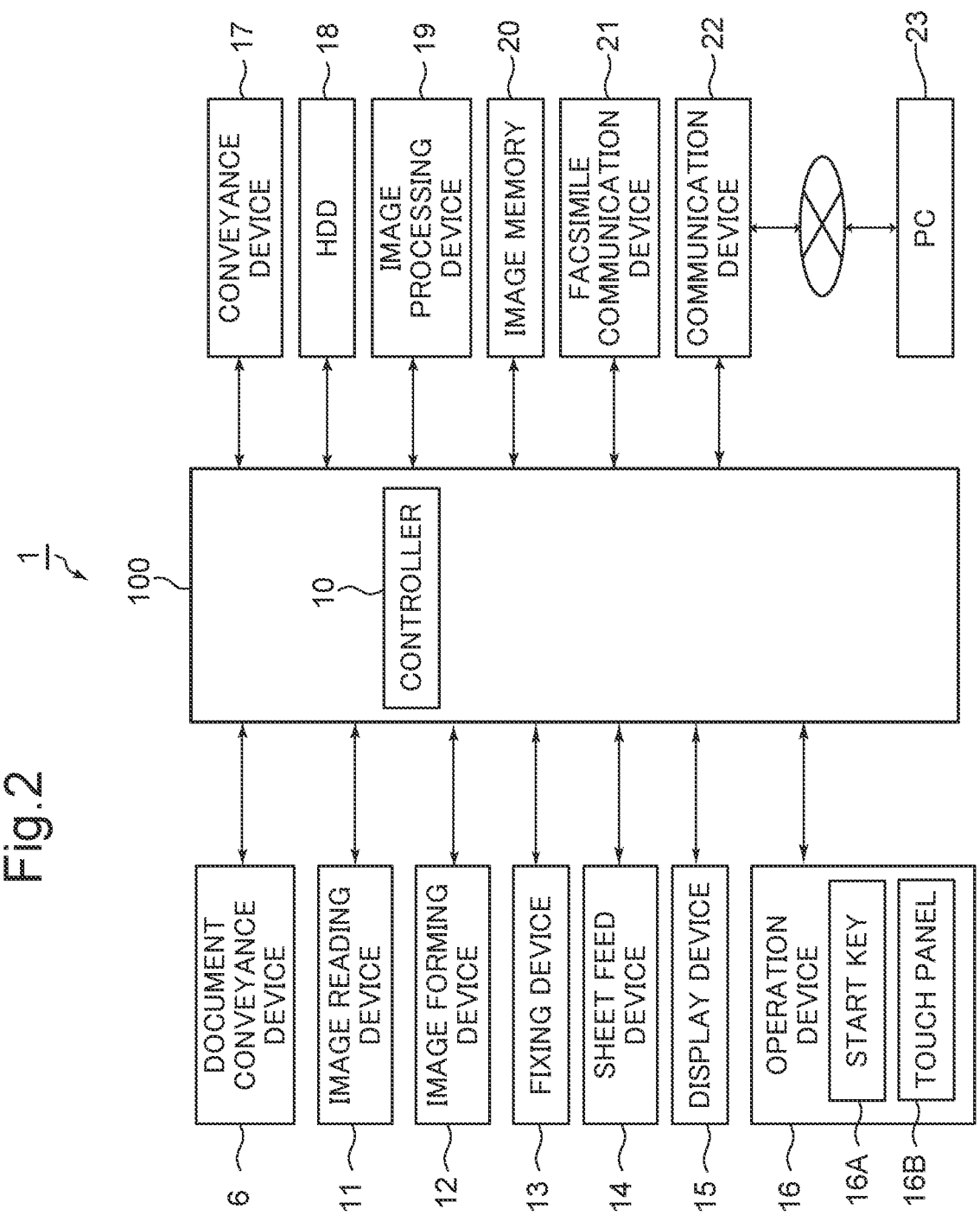
FIG. 2 is a block diagram showing an internal configuration of the image forming apparatus.

Hereinafter, a description will be given of an image forming apparatus as an information processing apparatus according to a first embodiment of the present disclosure with reference to the drawings. FIG. 1 is a frontal cross-sectional view showing the structure of an image forming apparatus according to the first embodiment of the present disclosure. FIG. 2 is a block diagram showing an internal configuration of the image forming apparatus. Referring to FIGS. 1 and 2, the image forming apparatus 1 is a multicolor multifunction peripheral configured so that jobs related to each of a plurality of predetermined functions can be executed.

The plurality of predetermined functions described above include, but are not limited to, in this embodiment, a copy function, a scan and send function, a job box function, a USB (universal serial bus) drive function, a facsimile transmission function, an ID (identification) card copy function, a cloud connector function, an Internet browser function, a custom box function, and a scan and save function.

A housing of the image forming apparatus 1 contains a plurality of devices for use in implementing various functions of the image forming apparatus 1. The housing contains, for example, an image reading device 11, an image forming device 12, a fixing device 13, a sheet feed device 14, and so on.

The image forming apparatus 1 includes a control device 100. The control device 100 includes a processor, a RAM (random access memory), a ROM (read only memory), and so on. The processor is, for example, a CPU (central processing unit), an MPU (micro processing unit), an ASIC (application specific integrated circuit) or the like.

When a control program stored in the ROM or an HDD 18 is executed by the above processor, the control device 100 functions as a controller 10. Alternatively, the controller 10 may not be implemented by the operation of the processor in accordance with the above control program, but may be constituted by a logic circuit.

The controller 10 governs the overall operation control of the image forming apparatus 1. More specifically, the controller 10 controls the operations of the devices constituting the image forming apparatus 1 and communications with a PC (personal computer) 23 and other external devices connected via a network. Furthermore, by operating in accordance with a first program described hereinafter, the controller 10 executes first history button display processing for allowing the display device 15 to display, in a first region of a home screen, some of respective icons representing a plurality of functions executable on the image forming apparatus 1 and display, in a second region of the home screen, only history buttons showing combinations of setting values for the respective functions represented by the icons being displayed in the first region.

The control device 100 is electrically connected to a document conveyance device 6, the image reading device 11, the image forming device 12, the fixing device 13, the sheet feed device 14, the display device 15, the operation device 16, a conveyance device 17, an HDD 18, an image processing device 19, an image memory 20, a facsimile communication device 21, a communication device 22, and so on.

The image reading device 11 is an ADF (auto document feeder) including: a document conveyance device 6 that conveys an original document placed on a document loading table; and a scanner that optically reading an original document conveyed by the document conveyance device 6 or an original document placed on a platen glass 7. The image reading device 11 irradiates the original document with light from a lighting part, receives light reflected from the original document on a CCD (charge-coupled device) sensor to read an image of the original document, and thus generates image data representing the image of the original document.

The image forming device 12 includes a plurality of photosensitive drums, charging devices, exposure devices, developing devices, and transfer devices, each provided for a corresponding one of different color toners. The image forming device 12 forms an image formed of a toner image on a recording paper sheet P being conveyed along a conveyance path T by the conveyance device 17, based on the image data generated by the image reading device 11 or image data or the like input through the communication device 22.

The fixing device 13 applies heat and pressure to the recording paper sheet P having the toner image formed thereon by the image forming device 12, thus fixing the toner image on the recording paper sheet P. The recording paper sheet P having the toner image fixed thereon by the fixing device 13 is discharged to a sheet output tray 8.

The sheet feed device 14 includes a manual feed tray, a first sheet feed cassette 14A, a second sheet feed cassette 14B, and a third sheet feed cassette 14C. The sheet feed device 14 pulls out recording paper sheets P contained in the first sheet feed cassette 14A, the second sheet feed cassette 14B or the third sheet feed cassette 14C or recording paper sheets placed on the manual feed tray, sheet by sheet, with a pick-up roller and feeds forward the pulled-out recording paper sheet to the conveyance path T.

The display device 15 is a display device composed of a liquid crystal display, an organic EL (an organic light-emitting diode) display or the like. The display device 15 displays, under the control of the controller 10, various screen images related to various functions executable by the image forming apparatus 1.

The operation device 16 includes a plurality of hard keys, such as a Start key 16A for instructing the start of execution of various types of processing. The operation device 16 further includes a touch panel 16B superposed on the top of the display device 15. Thus, the user can input to the operation device 16 various information, including instructions for various functions executable by the image forming apparatus 1.

The conveyance device 17 includes: rollers including conveyance roller pairs 17A and an ejection roller pair 17B; and a conveyance motor connected to the conveyance roller pairs 17A and the ejection roller pair 17B. The rollers including the conveyance roller pairs 17A and the ejection roller pair 17B are disposed along the conveyance path T. The controller 10 drives the conveyance motor to rotate the conveyance roller pairs 17A and the ejection roller pair 17B, thus allowing the rollers to convey the recording paper sheet P, which has been fed by the sheet feed device 14, toward the image forming device 12 and the sheet output tray 8 along the conveyance path T.

The HDD 18 is a large storage device for use in storing various types of data, including image data generated by the image reading device 11. The HDD 18 is an example of the storage device defined in CLAIMS. The HDD 18 stores various control programs for implementing general operations of the image forming apparatus 1. The HDD 18 holds, as one of the various control programs, a first program for executing first history button display processing according to the first embodiment.

The HDD 18 further holds image data representing a home screen. FIG. 3 is a view showing an example of a home screen. Referring to FIG. 3, the home screen 30 includes a predetermined first region 31 and a predetermined second region 32 different from the first region 31.

The HDD 18 further holds image data representing a scrollable menu image for use in being displayed in the first region 31. FIG. 4 is a view showing an example of a scrollable menu image for use in being displayed in the first region. Referring to FIG. 4, the scrollable menu image 40 includes respective icons 41A to 41J representing the above-described plurality of predetermined functions executable on the image forming apparatus 1. The icons 41A to 41E are aligned in this order on one side of the scrollable menu image 40 in the widthwise direction thereof and along the longitudinal direction of the scrollable menu image 40. The icons 41F to 41J are aligned in this order on the other side of the scrollable menu image 40 in the widthwise direction thereof and along the longitudinal direction of the scrollable menu image 40.

The HDD 18 further holds combinations of setting values set in respective jobs previously executed in relation to each of the above-described plurality of functions executable on the image forming apparatus 1. FIGS. 5A to 5D show examples of combinations of setting values. As shown in FIG. 5A, the HDD 18 holds, in association with the copy function, a combination 50A of setting values set in a copy job executed at 13:00:05 on Jan. 1, 2020 (hereinafter, the statements of the same date will be omitted), a combination 50B of setting values set in a copy job executed at 15:40:07, and a combination 50C of setting values set in a copy job executed at 17:53:02.

As shown in FIG. 5B, the HDD 18 holds, in association with the scan and send function, a combination 51A of setting values set in a scan and send job executed at 10:03:05, and a combination 51B of setting values set in a scan and send job executed at 14:40:09. As shown in FIG. 5C, the HDD 18 holds, in association with the facsimile transmission function, a combination 52A of setting values set in a facsimile transmission job executed at 14:00:07.

As shown in FIG. 5D, the HDD 18 holds, in association with the scan and save function, a combination 53A of setting values set in a scan and save job executed at 17:03:05. In this example, the HDD 18 does not hold any combination of setting values for the job box function, the USB drive function, the ID card copy function, the cloud connector function, the Internet browser function, and the custom box function, because no job related to these functions has been executed previously.

The image processing device 19 performs, as necessary, image processing of image data generated by the image reading device 11. The image memory 20 includes a region that temporarily stores image data generated by the image reading device 11. The facsimile communication device 21 performs connection to a public line and transfers image data to and from other facsimile devices via the public line.

The communication device 22 includes a communication module, such as a LAN (local area network) board. The image forming apparatus 1 performs data communications through the communication device 22 with external devices, such as the PC 23, connected thereto via the network.

Each of the devices constituting the image forming apparatus 1 is connected to a power supply and operates on electric power supplied from the power supply.

[Operations]

Figure 6:
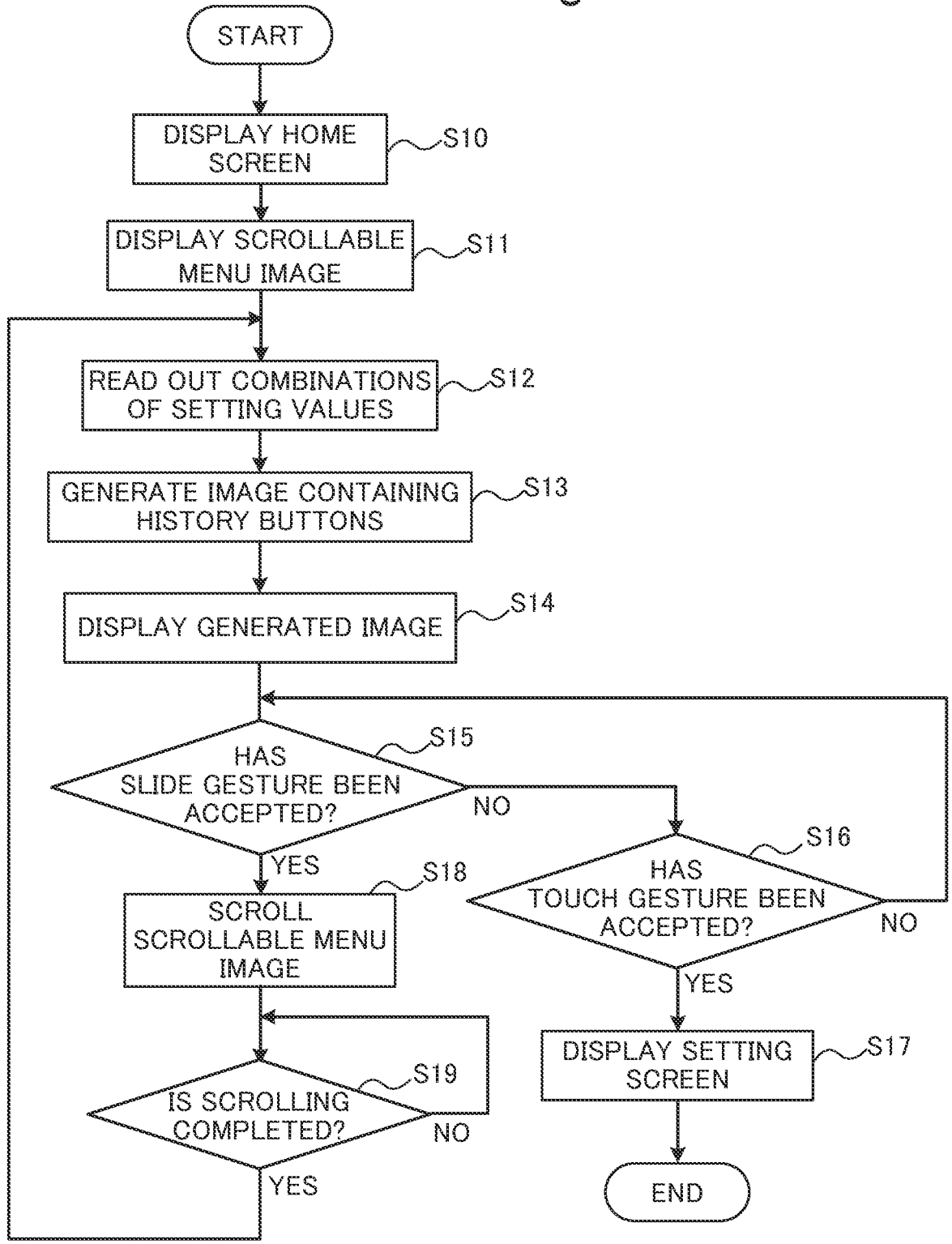
FIG. 6 is a flowchart showing first history button display processing.
Figure 7:
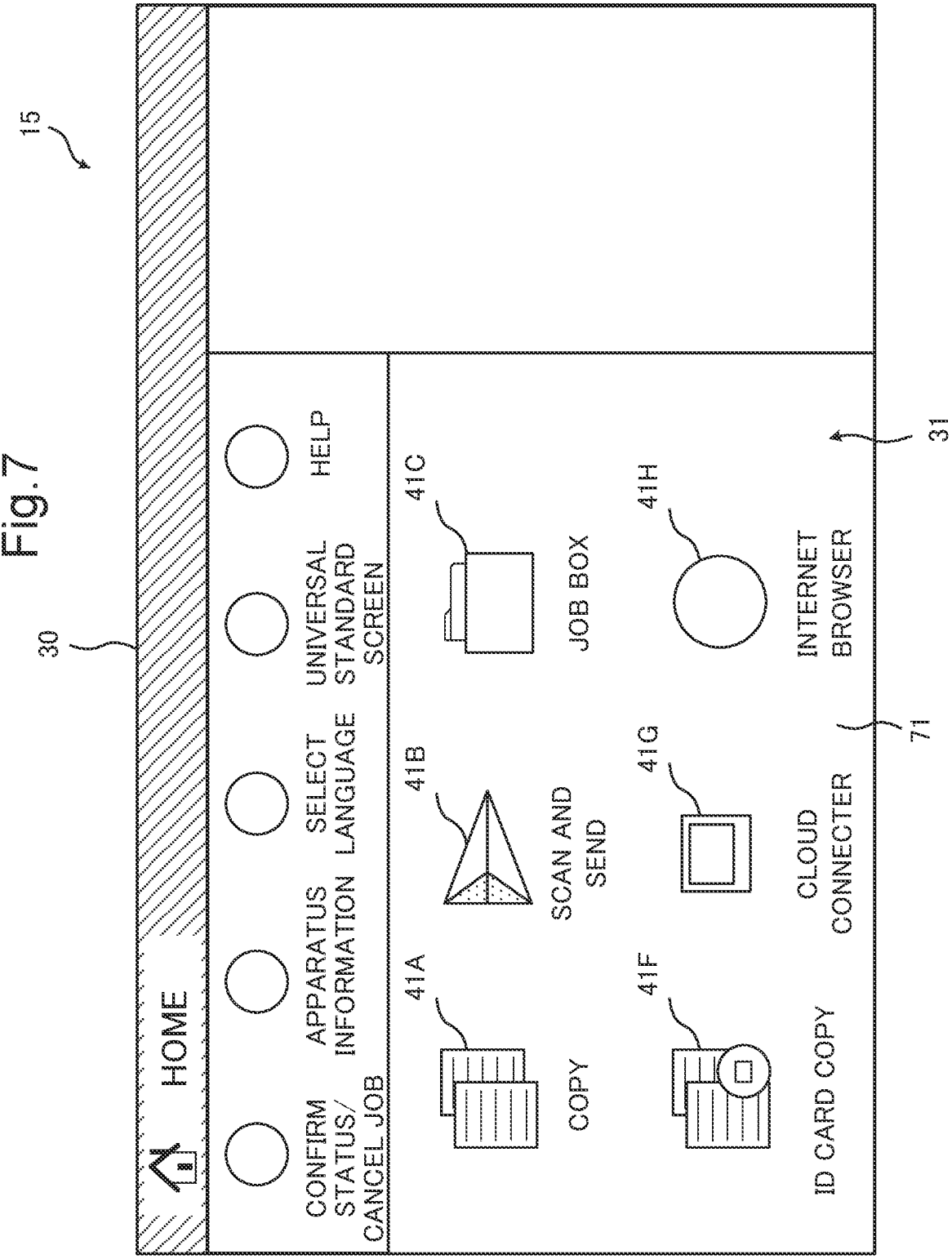
FIG. 7 is a view showing a state where a first portion of the scrollable menu image is displayed in the first region.
Figure 8:
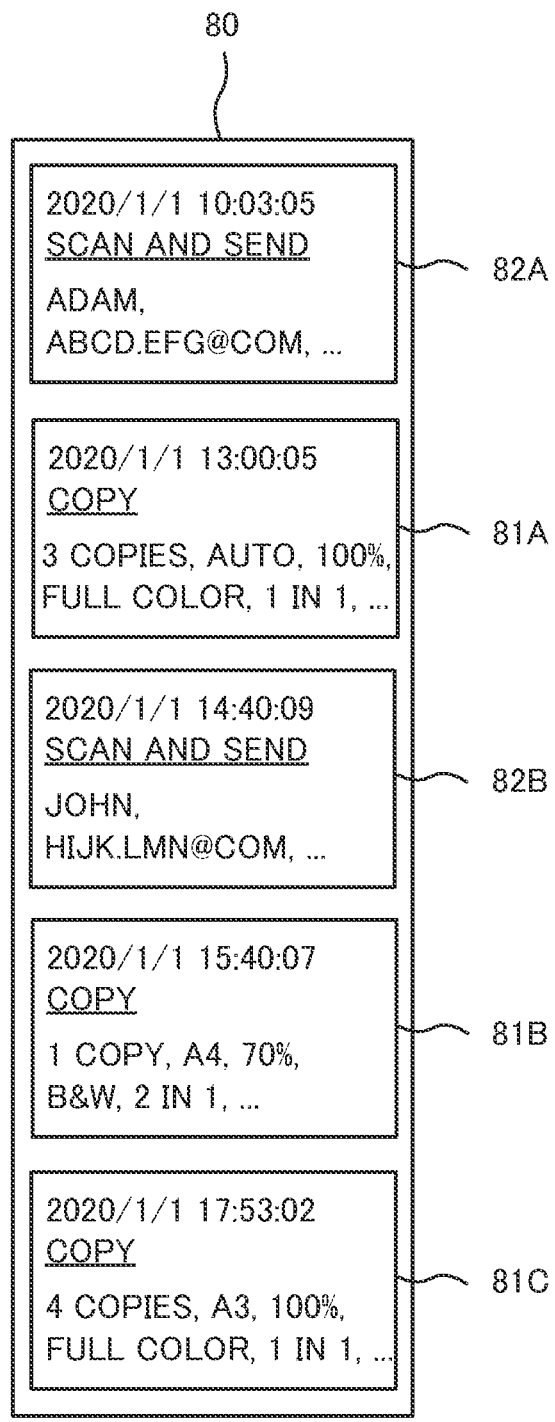
FIG. 8 is a view showing an example of an image containing history buttons.
Figure 9:
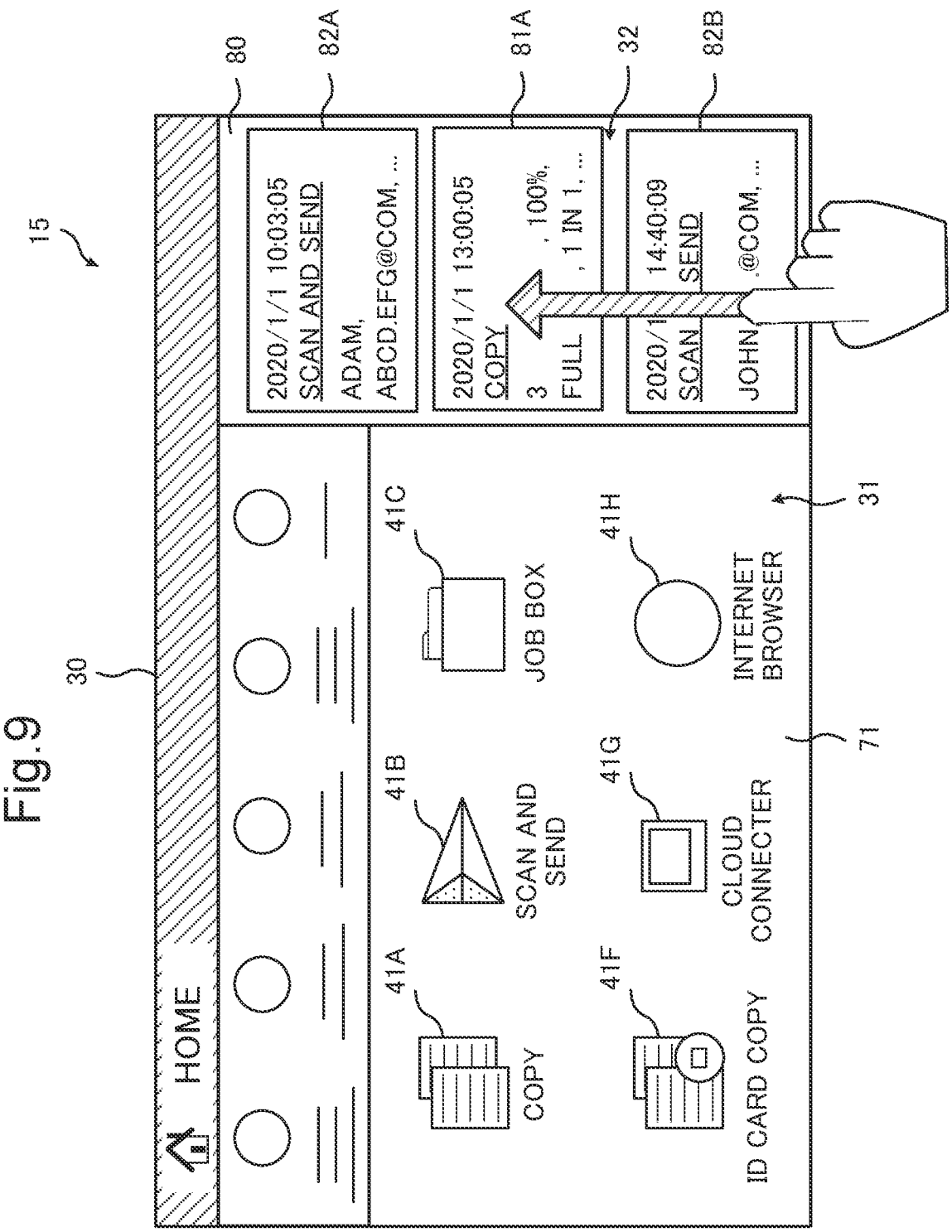
FIG. 9 is a view showing an example of a state where history buttons are displayed in a second region.
Figure 10:
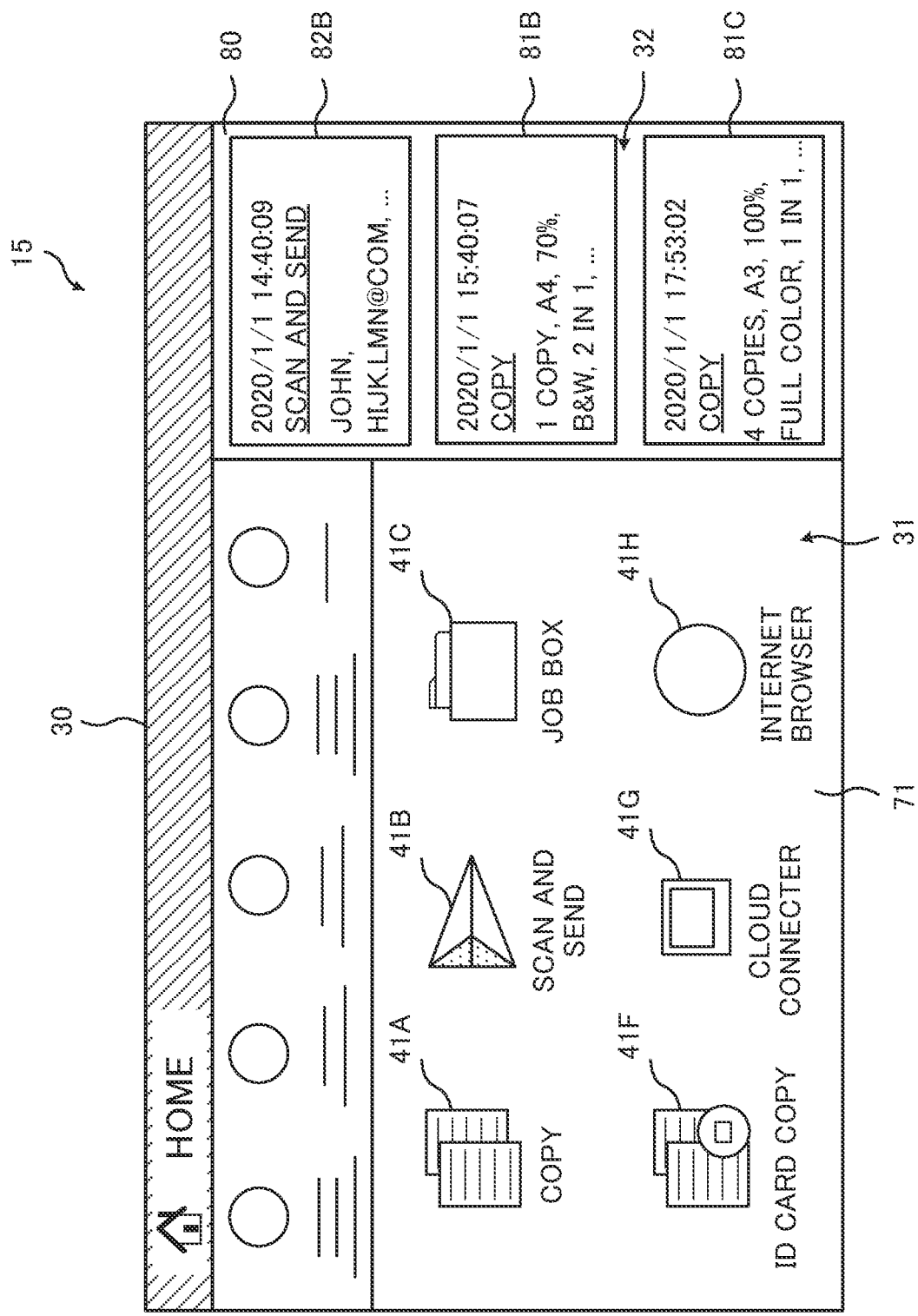
FIG. 10 is a view showing another example of a state where history buttons are displayed in the second region.
Figure 11:
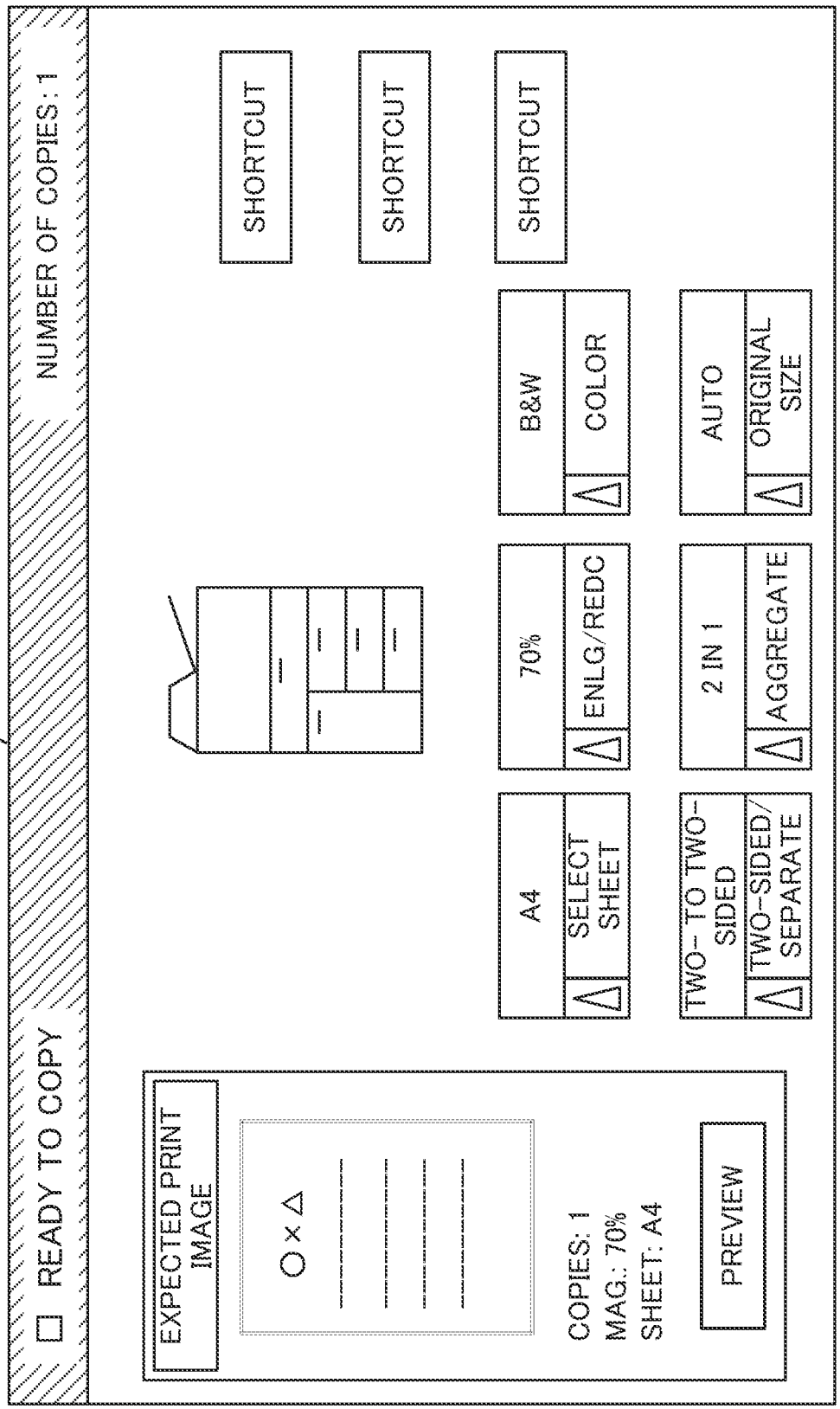
FIG. 11 is a view showing an example of a setting screen.
Figure 12:
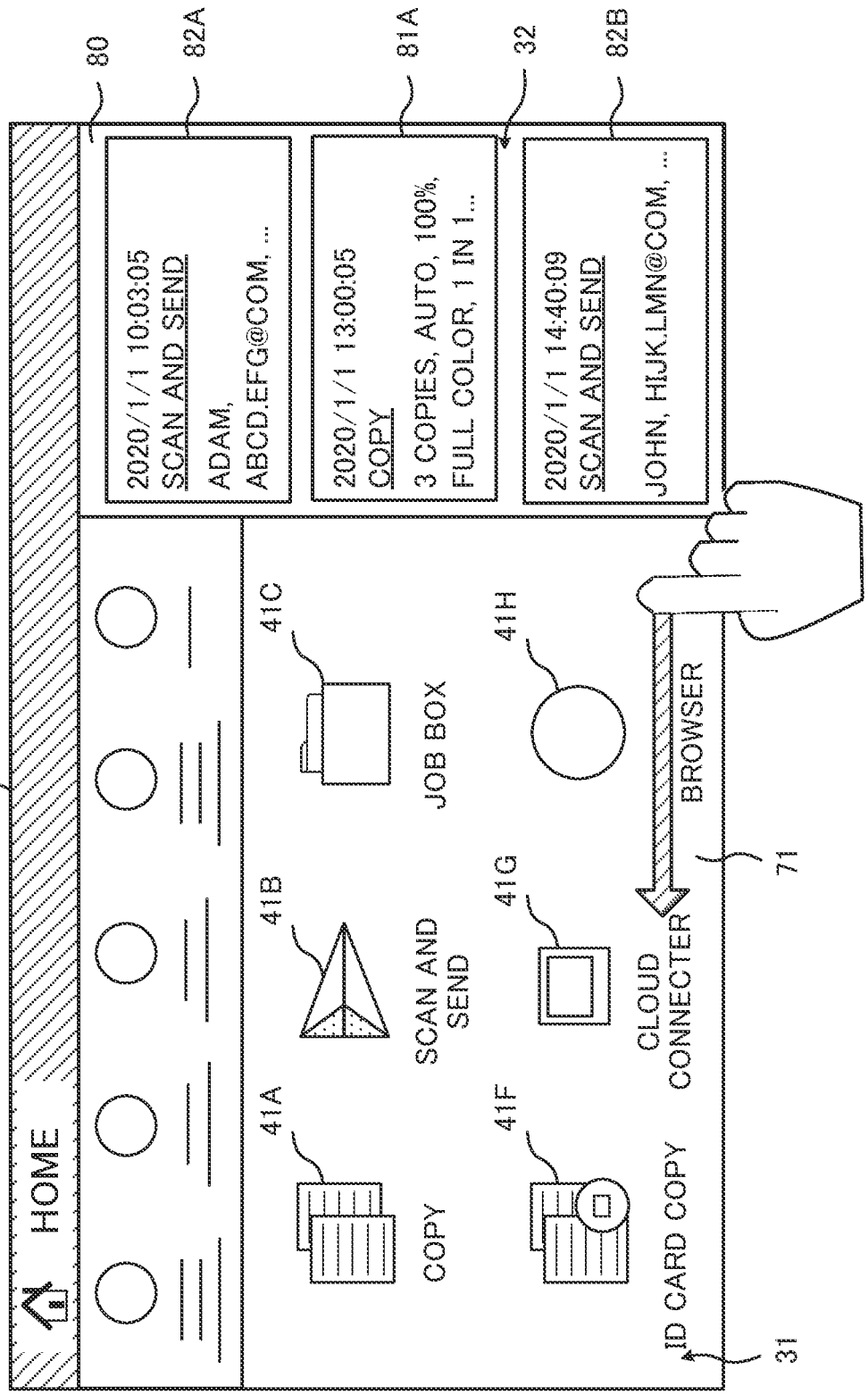
FIG. 12 is a view showing a state where a slide gesture is made on the scrollable menu image.
Figure 13:
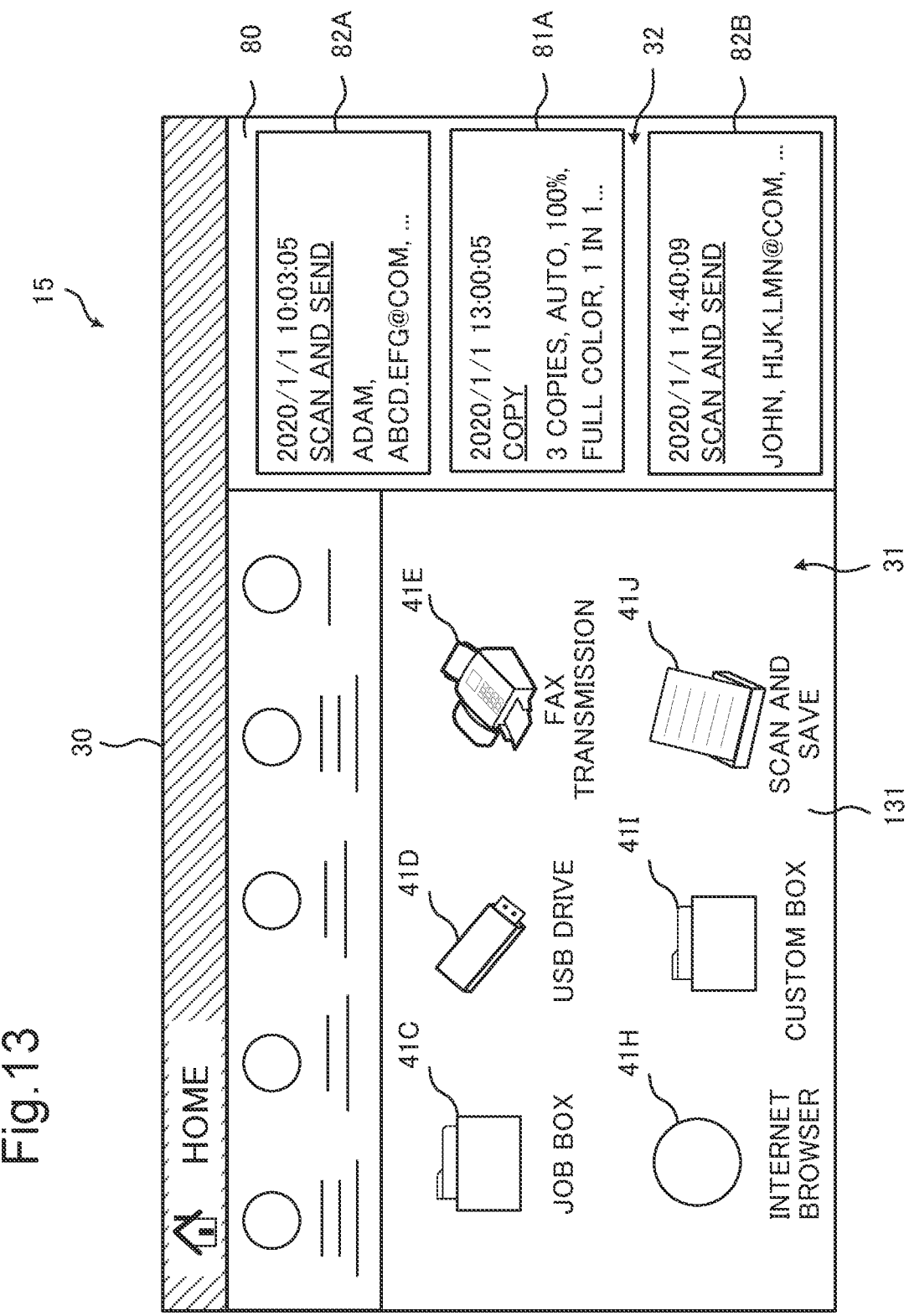
FIG. 13 is a view showing a state where a second portion of the scrollable menu image is displayed in the first region.
Figure 14:
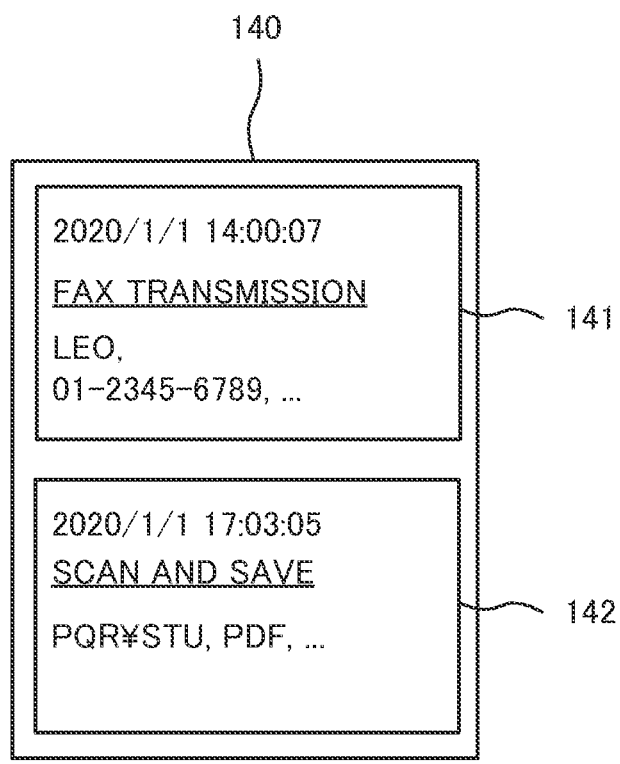
FIG. 14 is a view showing another example of an image containing history buttons.
Figure 15:
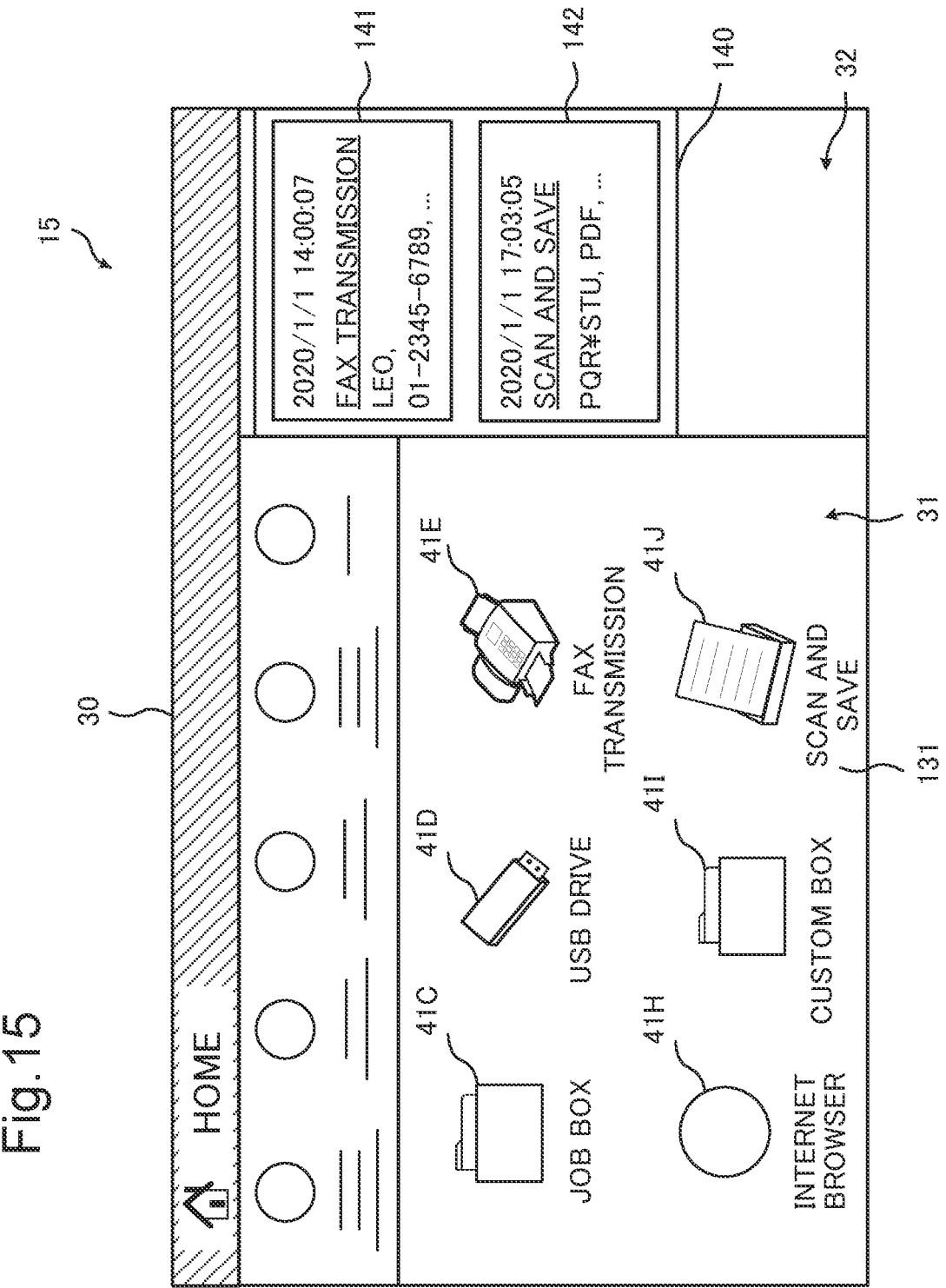
FIG. 15 is a view showing still another example of a state where history buttons are displayed in the second region.

FIG. 6 is a flowchart showing first history button display processing. FIG. 7 is a view showing a state where a first portion of the scrollable menu image 40 is displayed in the first region 31. FIGS. 8 and 14 are views showing examples of images containing history buttons. FIGS. 9, 10, and 15 are views each showing a state where history buttons are displayed in the second region 32. FIG. 11 is a view showing an example of a setting screen. FIG. 12 is a view showing a state where a slide gesture is made on the scrollable menu image 40. FIG. 13 is a view showing a state where a second portion of the scrollable menu image 40 is displayed in the first region 31.

A description will be given below of the operation of the image forming apparatus 1 when the first history button display processing is executed, with reference to FIGS. 3 to 15 and so on. When the image forming apparatus 1 is powered on or when the controller 10 accepts through the touch panel 16B an instruction to display the home screen 30, the controller 10 starts the execution of the first history button display processing shown in FIG. 6. In the first history button display processing, the controller 10 first allows the display device 15 to display the home screen 30 (step S10). After the processing in step S10, the controller 10 allows the display device 15 to display the scrollable menu image 40 in the first region 31 (step S11).

In this case, because the size of the scrollable menu image 40 in the longitudinal direction is greater than the size of the first region 31 in the longitudinal direction, the controller 10 cannot allow the display device 15 to display the whole of the scrollable menu image 40 in the first region 31 at a time. Therefore, as shown in FIG. 7, the controller 10 allows the display device 15 to display, as a portion of the scrollable menu image 40, a first portion 71 containing the icons 41A, 41B, 41C, 41F, 41G, and 41H in the first region 31.

After the processing in step S11, the controller 10 reads out, from the HDD 18, combinations of setting values for the respective functions represented by the icons 41A, 41B, 41C, 41F, 41G, and 41H contained in the first portion 71 (step S12). In other words, the controller 10 reads out, from the HDD 18, combinations of setting values for the respective functions represented by the icons being displayed in the first region 31. However, in this example, the HDD 18 does not hold any combination of setting values for the job box function represented by the icon 41C, the ID card copy function represented by the icon 41F, the cloud connector function represented by the icon 41G, and the Internet browser function represented by the icon 41H.

Therefore, in this case, the controller 10 reads out, from the HDD 18, combinations 50A, 50B, and 50C of setting values for the copy function represented by the icon 41A and combinations 51A and 51B of setting values for the scan and send function represented by the icon 41B. The combinations 50A, 50B, 50C, 51A, and 51B of setting values are examples of the first combinations defined in CLAIMS.

After the processing in step S12, as shown in FIG. 8, the controller 10 generates an image 80 containing: history buttons 81A, 81B, and 81C showing the read combinations 50A, 50B, and 50C of setting values, respectively; and history buttons 82A and 82B showing the read combinations 51A and 51B of setting values, respectively (step S13). The controller 10 generates the image 80 so that the history buttons 81A, 81B, 81C, 82A, and 82B are arranged along the longitudinal direction of the image 80 in chronological order starting from the most recent one according to the date of execution of jobs.

After the processing in step S13, as shown in FIG. 9, the controller 10 allows the display device 15 to display the image 80 in the second region 32 (step S14). In this case, because the size of the image 80 in the longitudinal direction is greater than the size of the second region 32 in the longitudinal direction, the controller 10 cannot allow the display device 15 to display the whole of the image 80 in the second region 32 at a time. Therefore, the controller 10 allows the display device 15 to display, as a portion of the image 80, a portion containing a predetermined number of (three as an example in this case) history buttons 82A, 81A, and 82B, starting from the most recent one, in the second region 32.

After the processing in step S14, the controller 10 repeats processing resulting in a determination that no slide gesture has been accepted (NO in step S15) and processing resulting in a determination that no touch gesture has been accepted (NO in step S16), until the scrollable menu image 40 is swiped or flicked or until any one of the history buttons 82A, 81A, and 82B is touched.

A description will be given here of the operation of the image forming apparatus 1 when accepting a flick gesture on the second region 32. As shown in FIG. 9, the user flicks the image 80 being displayed in the second region 32 toward one end of the image 80 in the longitudinal direction thereof. When accepting the flick gesture on the image 80 through the touch panel 16B, the controller 10 allows the display device 15 to scroll the image 80 within the second region 32 according to the distance of the flick gesture from the starting point to the end point, the speed of the flick gesture or so on.

In this case, as shown in FIG. 10, the controller 10 allows the display device 15 to scroll the image 80 until, as a portion of the image 80, a portion containing the history buttons 82B, 81B, and 81C is displayed in the second region 32. The user confirms the history buttons 82B, 81B, and 81C being displayed in the second region 32 and touches the history button 81B.

When accepting the touch gesture on the history button 81B through the touch panel 16B (YES in step S16), the controller 10 allows the display device 15 to display, as shown in FIG. 11, a setting screen 110 for use in configuring the setting for the copy function associated with the history button 81B, in a state where the setting screen 110 reflects the combination of setting values shown by the history button 81B (step S17). After the processing in step S17, the controller 10 ends the first history button display processing.

The user places an original document on the platen glass 7, confirms the setting screen 110, and then presses the Start key 16A. When detecting the pressing of the Start key 16A, the controller 10 allows, in accordance with the combination of setting values shown by the history button 81B, the image reading device 11 to read the original document placed on the platen glass 7 to generate image data representing a document image, and then the image forming device 12 and so on to form the document image represented by the image data on a recording paper sheet P.

The controller 10 may start the execution of the first history button display processing again after the elapse of a predetermined time since the end of the image formation on the recording paper sheet P. In doing so, the controller 10 newly generates, in step S13, an image 80 in which a history button showing the combination of setting values used in the most recently executed image formation processing is prepended to the sequence of history buttons 82A, 81A, 82B, 81B and 81C arranged in chronological order in the image 80 shown in FIG. 8 and, in step S14, allows the display device 15 to display the newly generated image 80 in the second region 32.

Next, a description will be given of the operation of the image forming apparatus 1 when accepting a slide gesture on the scrollable menu image 40 in step S15. As shown in FIG. 12, the user swipes the scrollable menu image 40 being displayed in the first region 31 toward one end of the scrollable menu image 40 in the longitudinal direction thereof. When accepting the above swipe gesture through the touch panel 16B, the controller 10 determines that a slide gesture has been accepted (YES in step S15), and allows the display device 15 to scroll the scrollable menu image 40 within the first region 31 according to the distance of the slide gesture from the starting point to the end point, the speed of the slide gesture or so on (step S18).

After the processing in step S18, the controller 10 repeats processing for determining whether or not scrolling is completed until the completion of scrolling of the scrollable menu image 40 (step S19). In this example, the controller 10 determines that scrolling is not completed (NO in step S19). Therefore, the controller 10 allows the display device 15 to scroll the scrollable menu image 40 until, as shown in FIG. 13, a second portion 131 containing the icons 41C, 41D, 41E, 41H, 41I, and 41J is displayed as a portion of the scrollable menu image 40 in the first region 31.

When determining that the scrolling of the scrollable menu image 40 is completed (YES in step S19), the controller 10 executes the above-described processing in step S12 to read out, from the HDD 18, combinations of setting values for the respective functions represented by the icons contained in the second portion 131 being displayed in the first region 31 at the completion of the scrolling, i.e., the icons 41C, 41D, 41E, 41H, 41I, and 41J in this case.

However, in this example, the HDD 18 does not hold any combination of setting values for the job box function represented by the icon 41C, the USB drive function represented by the icon 41D, the Internet browser function represented by the icon 41H, and the custom box function represented by the icon 41I. Therefore, the controller 10 reads out, from the HDD 18, a combination 52A of setting values for the facsimile transmission function represented by the icon 41E and a combination 53A of setting values for the scan and save function represented by the icon 41J. The combinations 52A and 53A of setting values are examples of the second combinations defined in CLAIMS.

After the processing in step S12, the controller 10 executes the above-described processing in step S13 to generate, as shown in FIG. 14, an image 140 containing only two buttons, i.e., a history button 141 showing the read combination 52A of setting values and a history button 142 showing the read combination 53A of setting values. The controller 10 generates the image 140 so that the history buttons 141 and 142 are arranged along the longitudinal direction of the image 140 in chronological order according to the date of execution of jobs.

After the processing in step S13, the controller 10 executes the above-described processing in step S14. In this case, because the size of the image 140 is smaller than that of the second region 32, the controller 10 allows the display device 15 to display the whole of the image 140 in the second region 32 as shown in FIG. 15. After the processing in step S14, the controller 10 executes the processing in step S15 and subsequent steps in the same manner as described above.

In the above-described general technique, history buttons for all the plurality of functions executable on the image forming apparatus are displayed on the other predetermined region. Therefore, the user has difficulty finding out a desired combination of setting values to be applied to the next job and spends a lot of time and effort to find out the desired combination of setting values.

In contrast, in the first embodiment, the controller 10 allows the display device 15 to display the first portion 71 of the scrollable menu image 40 in the first region 31, reads out, from the HDD 18, the combinations 50A, 50B, 50C, 51A, and 51B of setting values as combinations of setting values for respective functions represented by the icons 41A, 41B, 41C, 41F, 41G, and 41H contained in the first portion 71, and allows the display device 15 to display an image 80 containing the history buttons 81A, 81B, 81C, 82A, and 82B showing the combinations 50A, 50B, 50C, 51A, and 51B of setting values, respectively, in the second region 32. When accepting a touch gesture on the history button 81B through the touch panel 16B, the controller 10 allows the display device 15 to display a setting screen 110 for the copy function associated with the history button 81B, in a state where the setting screen 110 reflects the combination of setting values shown by the history button 81B. When accepting an instruction to execute a job through the operation device 16 while the above setting screen 110 is displayed, the controller 10 executes the job for the copy function associated with the history button 81B, in accordance with the combination of setting values shown by the history button 81B. Alternatively, upon acceptance of a touch gesture on the history button 81B through the touch panel 16B, the controller 10 may execute the job for the copy function associated with the history button 81B, in accordance with the combination of setting values shown by the history button 81B.

As seen from the above, the contents to be displayed in the second region 32 are, in all of combinations of setting values stored in the HDD 18, only combinations of setting values for functions which satisfy a predetermined condition that they are being displayed in the first region 31. Therefore, it is possible to eliminate the user's work of excluding combinations of setting values for functions being not displayed in the first region 31 and, therefore, not satisfying the predetermined condition. In addition, since the range of combinations of setting values to be displayed is narrowed as compared to the case where combinations of setting values for all the plurality of predetermined functions are displayed, it is possible to save the user's time and effort required to find out a desired combination of setting values.

Furthermore, in the first embodiment, when accepting a slide gesture on the scrollable menu image 40 through the touch panel 16B, the controller 10 allows the display device 15 to scroll the scrollable menu image 40 within the first region 31 and, upon completion of the scrolling, allows the display device 15 to display the second portion 131 of the scrollable menu image 40 in the first region 31. In addition, the controller 10 reads out, from the HDD 18, the combinations 52A and 53A of setting values as combinations of setting values for respective functions represented by the icons 41C, 41D, 41E, 41H, 41I, and 41J contained in the second portion 131 and allows the display device 15 to display in the second region 32 an image 140 containing the history buttons 141 and 142 showing the combinations 52A and 53A of setting values, respectively.

As just described, when the functions being displayed in the first region 31 are changed by the scrolling of the scrollable menu image 40, only the combinations of setting values for the functions displayed after the display change are displayed in the second region 32. Therefore, the user can easily change the combination of setting values to be displayed in the second region 32 to a combination of setting values for a desired function. Thus, the user-friendliness can be further increased.

Modification of First Embodiment

Although in the first embodiment the controller 10 allows the display device 15 to scroll the scrollable menu image 40 to change icons being displayed in the first region 31, the present disclosure is not limited to the manner described in the above embodiment. For example, the controller 10 may allow the display device 15 to switch the page of an image containing a plurality of icons being displayed in the first region 31, thus changing icons being displayed in the first region 31.

Although in the first embodiment the controller 10 allows the display device 15 to continue to display the image 80 in the second region 32 without scrolling the image 80 until the completion of scrolling of the scrollable menu image 40, the present disclosure is not limited to the manner described in the above embodiment. For example, the controller 10 may allow the display device 15 to scroll the image 80 within the second region 32 until the completion of scrolling of the scrollable menu image 40. Thus, the user can intuitively perceive that the combinations of setting values being displayed in the second region 32 will be changed according to changes of the functions being displayed in the first region 31.

Although in the first embodiment the controller 10 allows the display device 15 to display the image 140 in the second region 32 upon completion of scrolling of the scrollable menu image 40, the present disclosure is not limited to the manner described in the above embodiment. For example, the controller 10 may allow the display device 15 to display the image 140 in the second region 32 after the elapse of a predetermined first time since the completion of scrolling of the scrollable menu image 40.

Thus, even if the scrolling of the scrollable menu image 40 is completed, until the first time passes, the user can make a touch gesture on any one of the history buttons 81A, 81B, 81C, 82A, and 82B. Therefore, even if, for example, the user scrolls the scrollable menu image 40 by mistake, the user can select any combination of setting values having been displayed before the scrolling. Thus, the user-friendliness can be further increased.

In addition, when the controller 10 accepts a touch gesture on, for example, the history button 81B before the elapse of the above-described first time and the touch gesture is continued for a predetermined second time or more, the controller 10 may allow the display device 15 to display the first portion 71 of the first region 31. On the other hand, when the touch gesture is continued for less than the second time, the controller 10 may allow the display device 15 to display the setting screen 110 in which the combination of setting values shown by the history button 81B is reflected or may execute the job for the copy function associated with the history button 81B, in accordance with the combination of setting values shown by the history button 81B.

Thus, by changing the time length of a touch gesture on any one of the history buttons 81A, 81B, 81C, 82A, and 82B, the user can return the display in the first region 31 to a state before the scrolling or select any one of the combinations of setting values having been displayed in the second region 32 before the scrolling. Therefore, the user-friendliness can be further increased.

Figure 16:
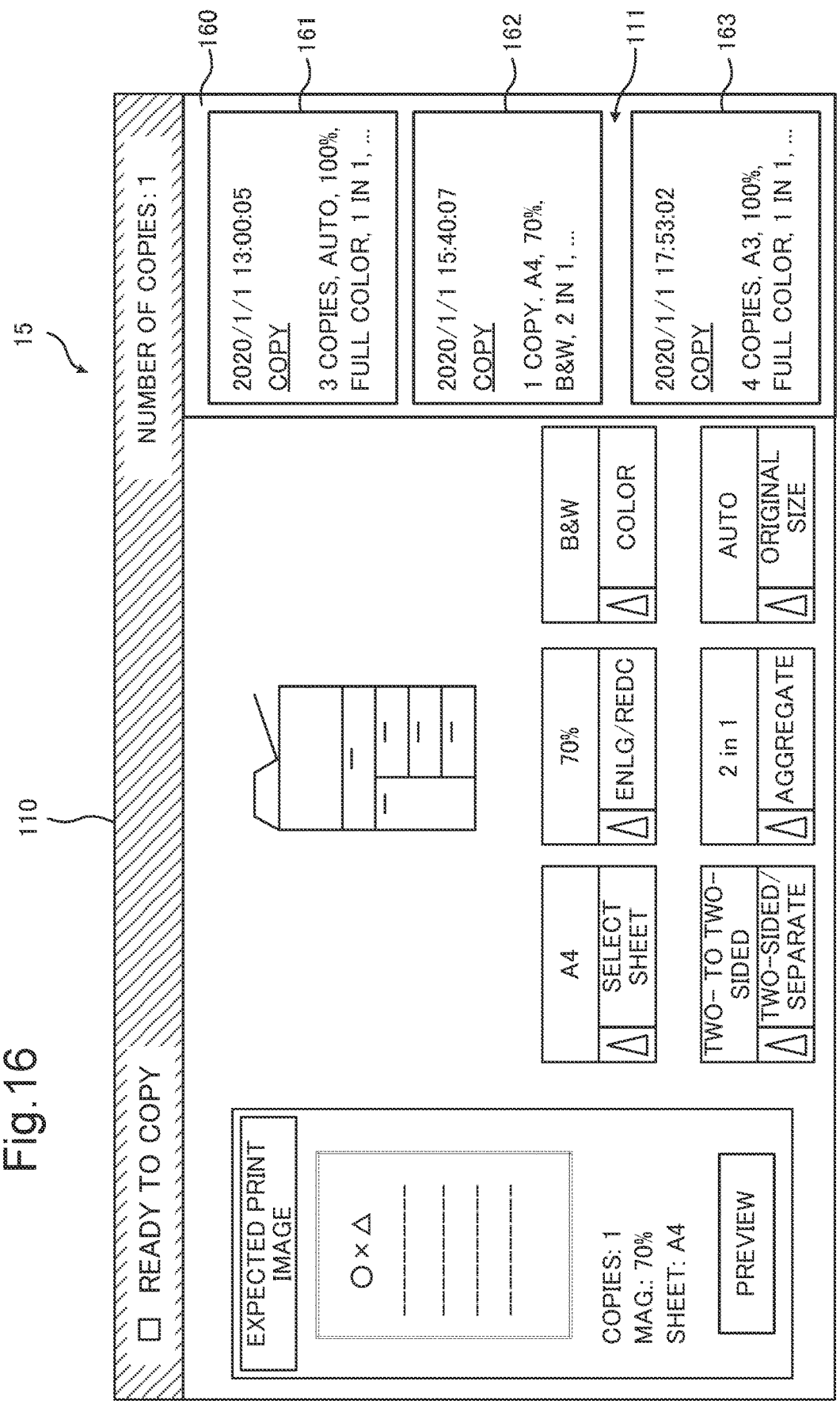
FIG. 16 is a view showing another example of a setting screen.

Although in the first embodiment the controller 10, in step S17, allows the display device 15 to display the setting screen 110 for the copy function associated with the touched history button 81B in a state where the setting screen 110 reflects the combination of setting values shown by the history button 81B, the present disclosure is not limited to the manner described in the above embodiment. FIG. 16 is a view showing another example of the setting screen 110. For example, as a modification of the first embodiment, the controller 10 may additionally read out, from the HDD 18, combinations of setting values for the function associated with the touched history button and, as shown in FIG. 16, allow the display device 15 to display an image containing respective history buttons showing the read combinations of setting values in a predetermined region 111 of the setting screen 110. FIG. 16 shows an example where the controller 10 reads out, from the HDD 18, combinations 50A, 50B, and 50C of setting values for the copy function associated with the touched history button 81B and allows the display device 15 to display an image 160 containing history buttons 161, 162, and 163 showing the read combinations 50A, 50B, and 50C of setting values, respectively, in the region 111.

Second Embodiment

Hereinafter, a description will be given of an information processing apparatus 1 according to a second embodiment of the present disclosure, focusing on differences from the first embodiment. The image forming apparatus 1 according to the second embodiment has the same configuration as that according to the first embodiment, except that the HDD 18 holds, instead of the first program, a second program for executing second history button display processing according to the second embodiment.

In the second embodiment, by operating in accordance with the second program, the controller 10 executes second history button display processing for allowing the display device 15 to display, in the second region 32 of the home screen 30, history buttons showing respective combinations of setting values for the plurality of functions in a manner classified by function.

[Operations]

Figure 17:
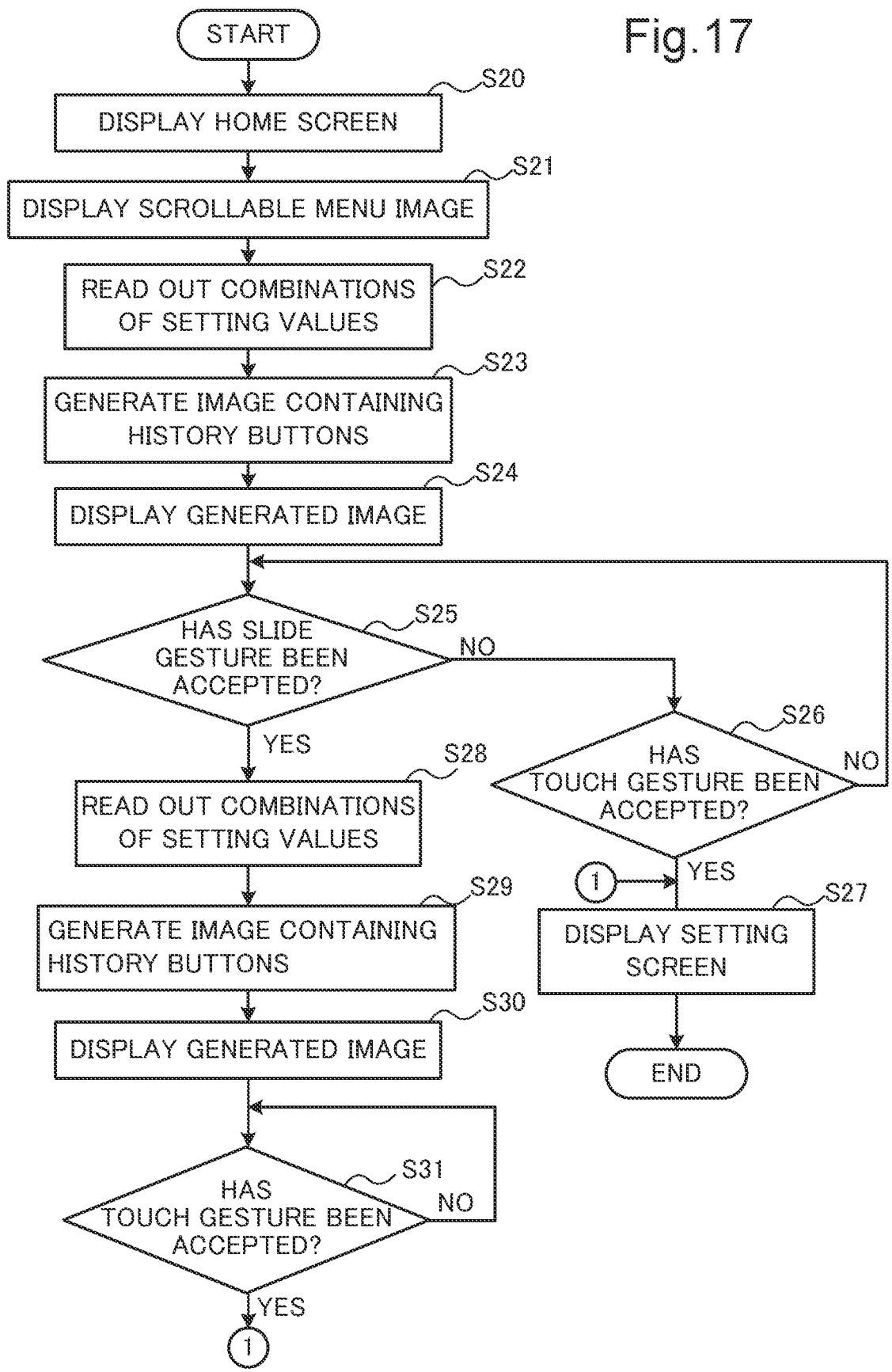
FIG. 17 is a flowchart showing second history button display processing.
Figure 18:
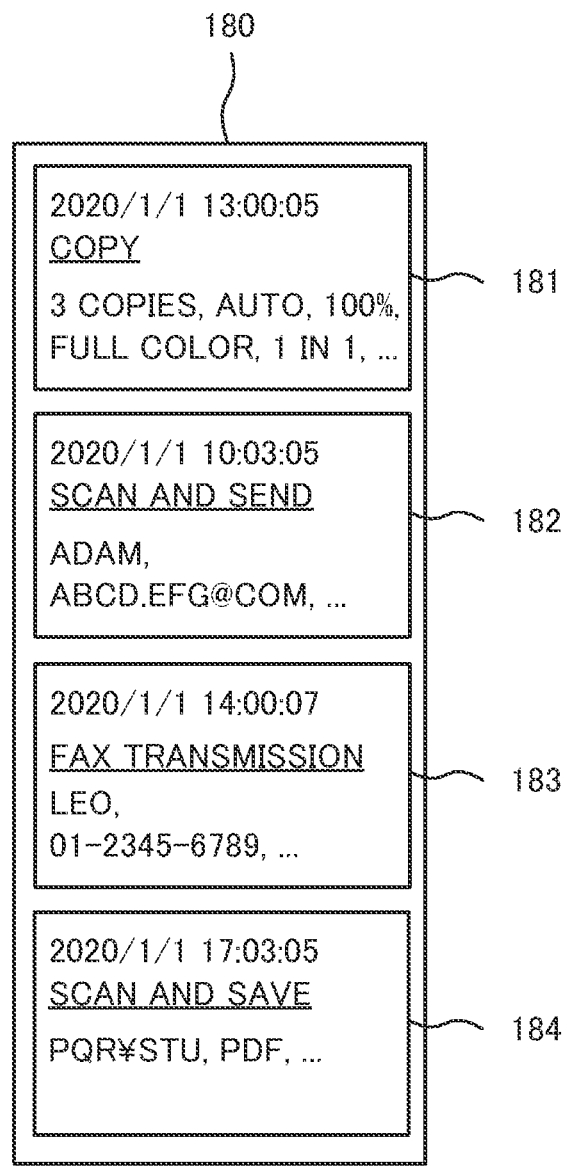
FIG. 18 is a view showing still another example of an image containing history buttons.
Figure 19:
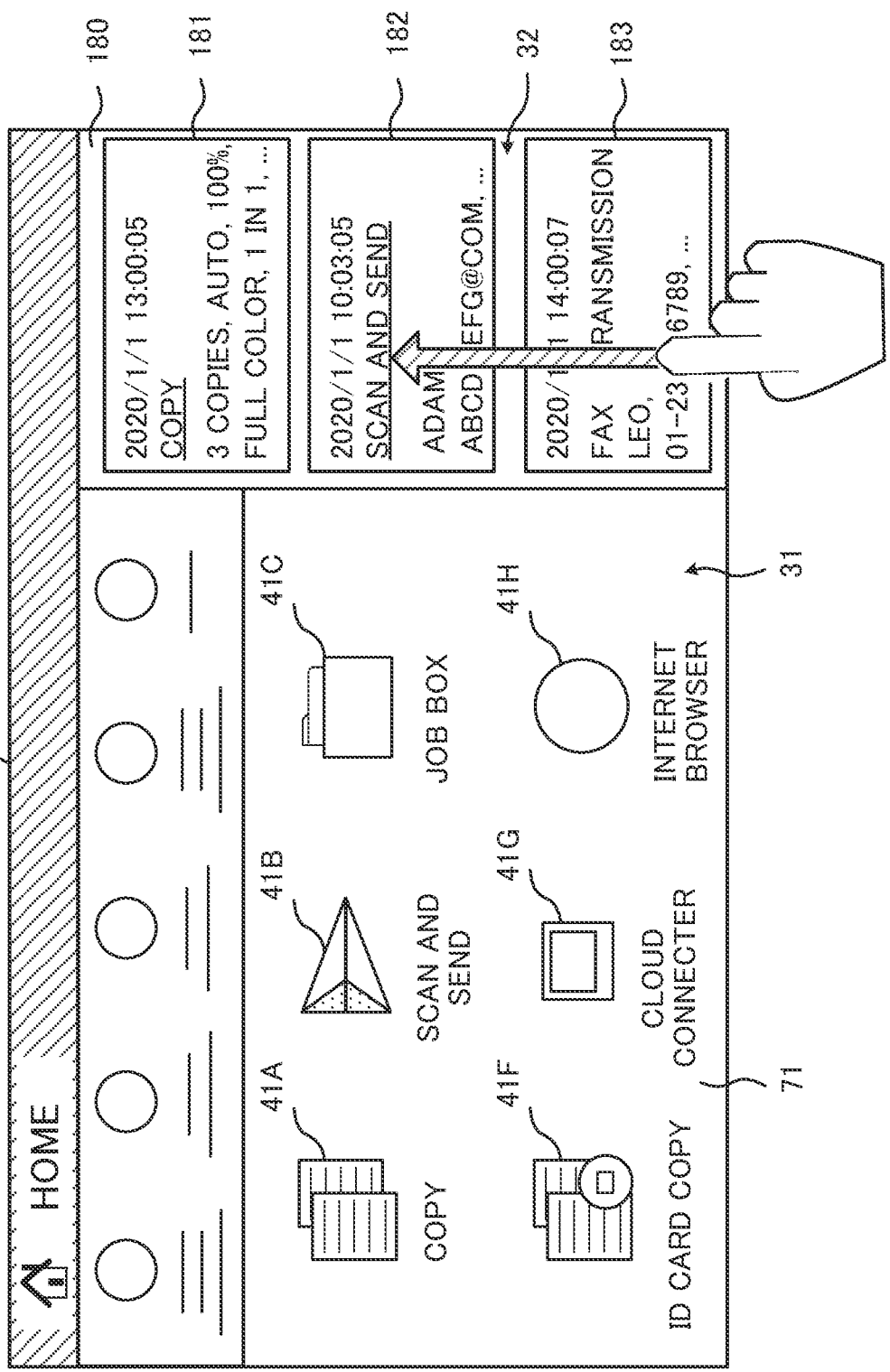
FIG. 19 is a view showing still another example of a state where history buttons are displayed in the second region.
Figure 20:
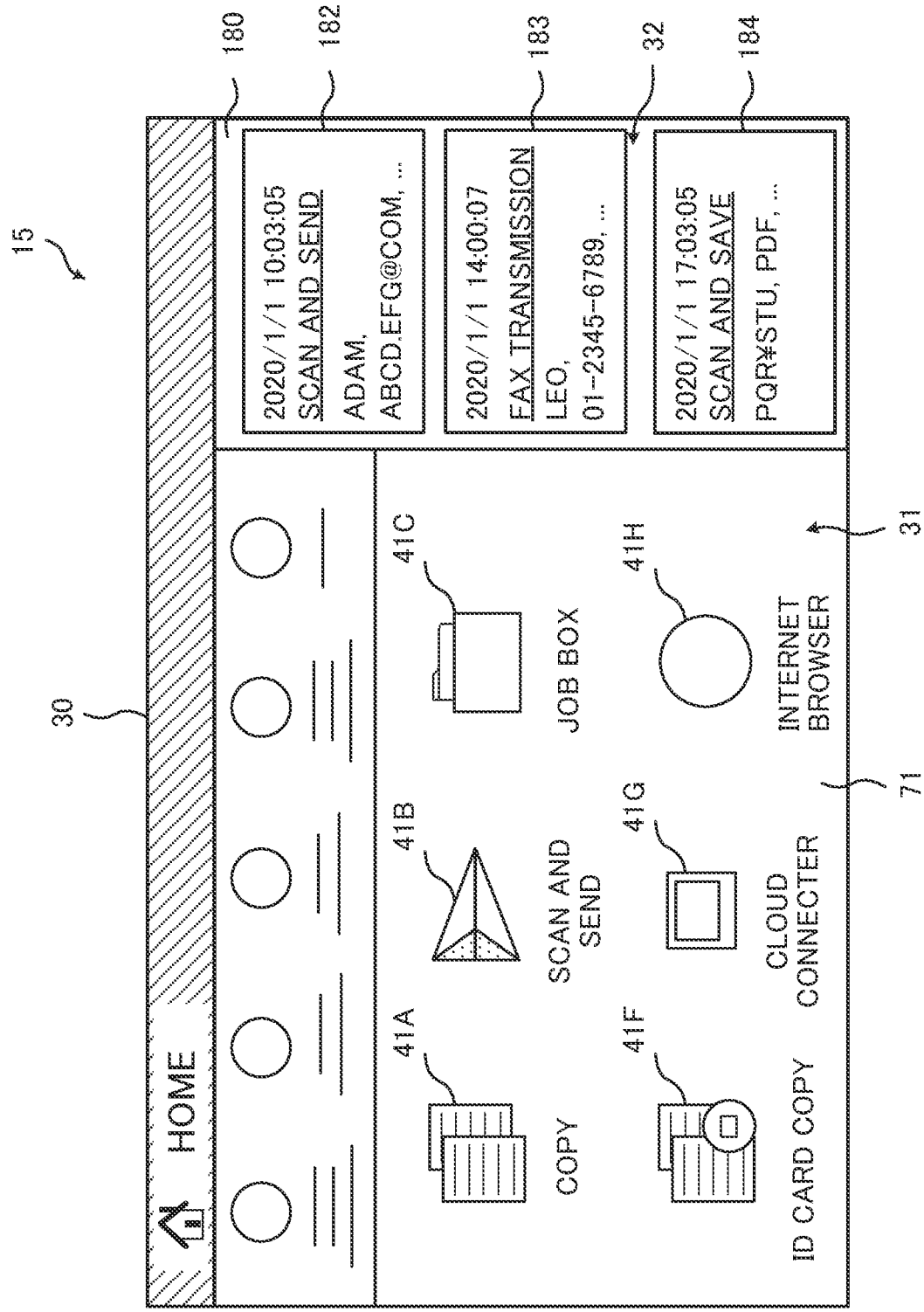
FIG. 20 is a view showing still another example of a state where history buttons are displayed in the second region.
Figure 21:
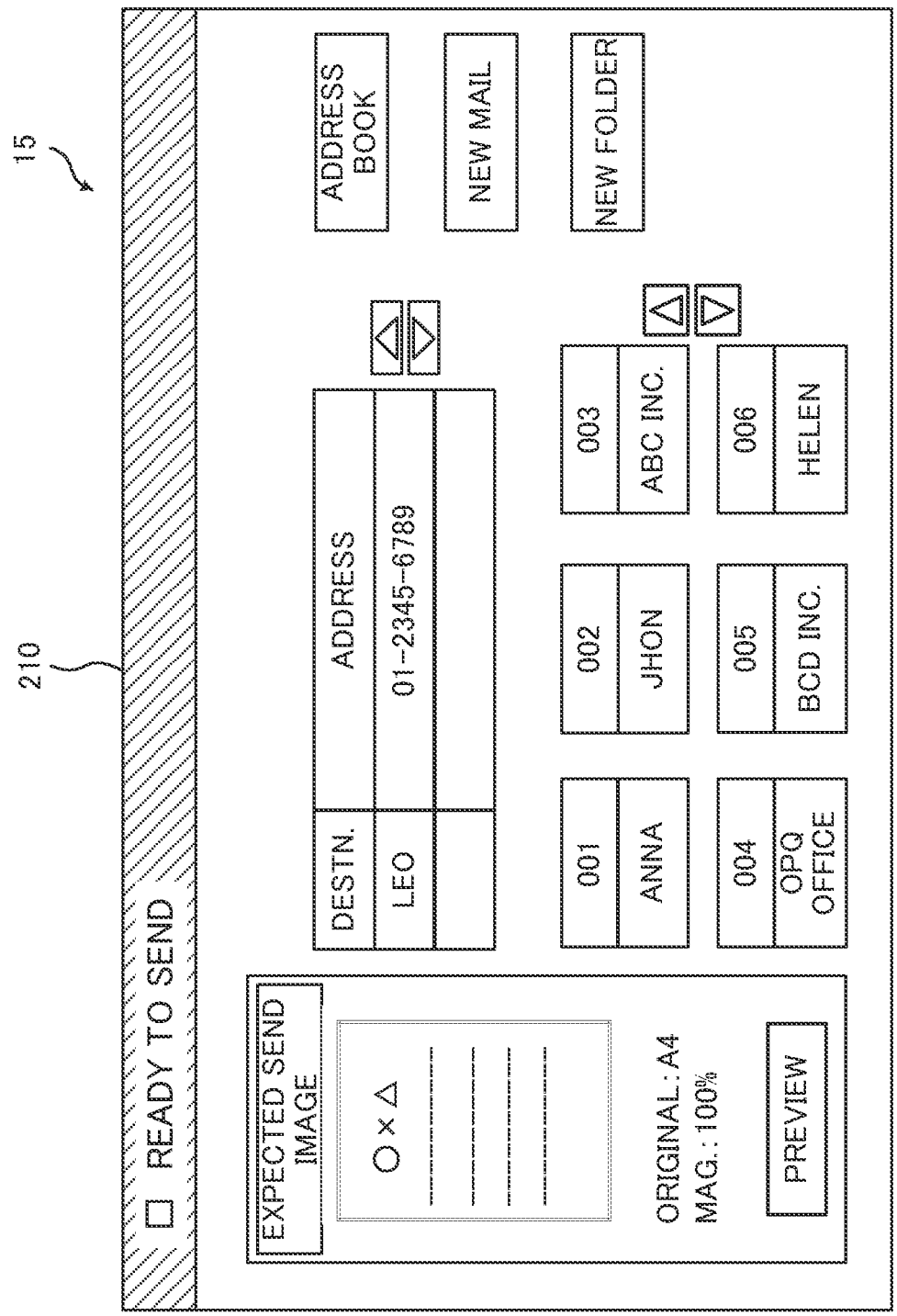
FIG. 21 is a view showing still another example of a setting screen.
Figure 22:
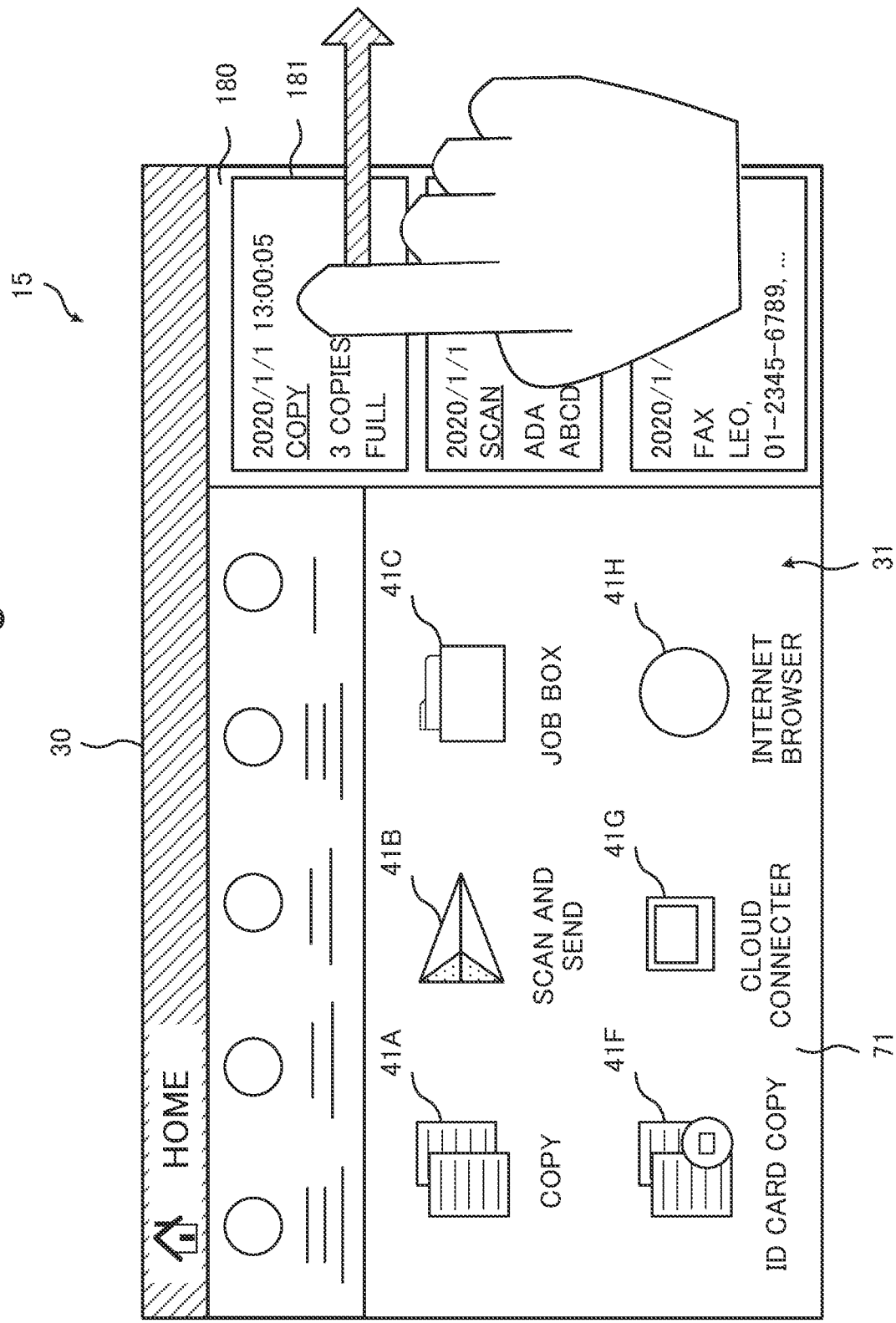
FIG. 22 is a view showing a state where a slide gesture is made on a history button.
Figure 23:
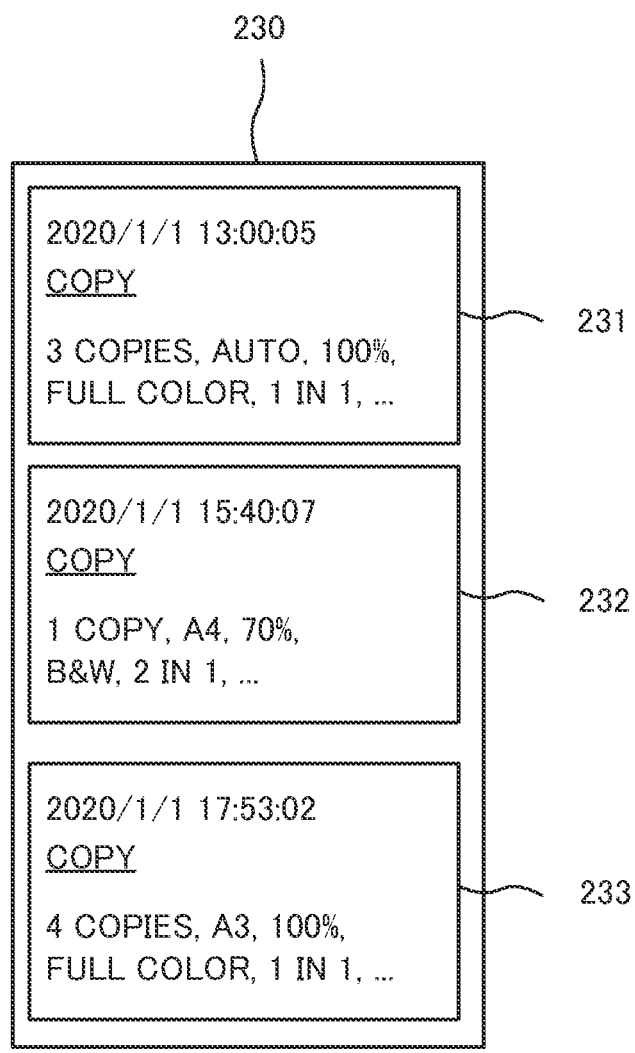
FIG. 23 is a view showing still another example of an image containing history buttons.

FIG. 17 is a flowchart showing the second history button display processing. FIGS. 18 and 23 are views showing still another examples of an image containing history buttons. FIGS. 19, 20, and 24 are views each showing a state where history buttons are displayed in the second region 32. FIG. 21 is a view showing still another example of a setting screen. FIG. 22 is a view showing a state where a slide gesture is made on a history button. A description will be given below of the operation of the image forming apparatus 1 when the second history button display processing is executed, with reference to FIGS. 17 to 24 and so on.

When the image forming apparatus 1 is powered on or when the controller 10 accepts through the touch panel 16B an instruction to display the home screen 30, the controller 10 starts the execution of the second history button display processing shown in FIG. 17. In the second history button display processing, the controller 10 first allows the display device 15 to display the home screen 30 (step S20). After the processing in step S20, the controller 10 allows the display device 15 to display the scrollable menu image 40 in the first region 31 (step S21). In this case, as shown in FIG. 7, the controller 10 allows the display device 15 to display the first portion 71 of the scrollable menu image 40 in the first region 31.

After the processing in step S21, the controller 10 reads out, from the HDD 18, respective combinations of setting values for respective jobs most recently executed in relation to each of the plurality of functions represented by the icons 41A to 41J contained in the scrollable menu image 40 (step S22). In other words, the controller 10 reads out, from the HDD 18, combinations of setting values, one combination for each of the respective functions represented by the icons being displayed in the first region 31. However, in this example, the HDD 18 does not hold any combination of setting values for the job box function represented by the icon 41C, the USB drive function represented by the icon 41D, the ID card copy function represented by the icon 41F, the cloud connector function represented by the icon 41G, the Internet browser function represented by the icon 41H, and the custom box function represented by the icon 41I.

Therefore, in this example, the combinations of setting values for the most recently executed jobs read out from the HDD 18 by the controller 10 are a combination 50A of setting values for the copy function represented by the icon 41A, a combination 51A of setting values for the scan and send function represented by the icon 41B, a combination 52A of setting values for the facsimile transmission function represented by the icon 41E, and a combination 53A of setting values for the scan and save function represented by the icon 41J.

After the processing in step S22, as shown in FIG. 18, the controller 10 generates an image 180 containing a history button 181 showing the read combination 50A of setting values, a history button 182 showing the read combination 51A of setting values, a history button 183 showing the read combination 52A of setting values, and a history button 184 showing the read combination 53A of setting values (step S23). In doing so, the controller 10 generates the image 180 so that the history buttons 181, 182, 183, and 184 are arranged along the longitudinal direction of the image 180.

After the processing in step S23, as shown in FIG. 19, the controller 10 allows the display device 15 to display the image 180 in the second region 32 (step S24). In other words, the controller 10 allows the display device 15 to display, in the second region 32, respective history buttons showing the read combinations of setting values in a manner classified by function. In this case, because the size of the image 180 in the longitudinal direction is greater than the size of the second region 32 in the longitudinal direction, the controller 10 cannot allow the display device 15 to display the whole of the image 180 in the second region 32 at a time. Therefore, the controller 10 allows the display device 15 to display, as a portion of the image 180, a portion containing a predetermined number of (three as an example in this case) history buttons 181, 182, and 183 in the second region 32.

After the processing in step S24, the controller 10 repeats processing resulting in a determination that no slide gesture has been accepted (NO in step S25) and processing resulting in a determination that no touch gesture has been accepted (NO in step S26), until any one of the history buttons 181, 182, 183, and 184 is swiped or flicked in the widthwise direction of the image 180 or until any one of the history buttons 181, 182, 183, and 184 is touched.

A description will be given here of the operation of the image forming apparatus 1 when accepting a flick gesture on the second region 32. As shown in FIG. 19, the user swipes the image 180 being displayed in the second region 32 toward one end of the image 180 in the longitudinal direction thereof. When accepting through the touch panel 16B the swipe gesture on the image 180 in the longitudinal direction of the image 180, the controller 10 allows the display device 15 to scroll the image 180 within the second region 32 in the longitudinal direction thereof according to the distance of the swipe gesture from the starting point to the end point, the speed of the swipe gesture or so on.

In this case, as shown in FIG. 20, the controller 10 allows the display device 15 to scroll the image 180 until a portion containing the history buttons 182, 183, and 184 is displayed as a portion of the image 180 in the second region 32. The user confirms the history buttons 182, 183, and 184 being displayed in the second region 32 and touches the history button 183.

When accepting the touch gesture on the history button 183 through the touch panel 16B (YES in step S26), the controller 10 allows the display device 15 to display, as shown in FIG. 21, a setting screen 210 for use in configuring the setting for the facsimile transmission function associated with the history button 183, in a state where the setting screen 210 reflects the combination of setting values shown by the history button 183 (step S27). After the processing in step S27, the controller 10 ends the second history button display processing.

The user places an original document on the platen glass 7, confirms the setting screen 210, and then presses the Start key 16A. When detecting the pressing of the Start key 16A, the controller 10 allows, in accordance with the combination of setting values shown by the history button 183, the image reading device 11 to read the original document placed on the platen glass 7 to generate image data representing a document image, and then the facsimile communication device 21 to send the generated image data to an external device.

The controller 10 may start the execution of the second history button display processing again after the elapse of a predetermined time since the end of the facsimile transmission. In doing so, the controller 10 newly generates, in step S23, an image 180 containing, instead of the history button 183 contained in the former image 180, a history button showing the combination of setting values for the most recently executed facsimile transmission processing and, in step S24, allows the display device 15 to display the newly generated image 180 in the second region 32.

Next, a description will be given of the operation of the image forming apparatus 1 when accepting a slide gesture on any one of the history buttons 181, 182, 183, and 184 in step S25. As shown in FIG. 22, the user flicks the history button 181 toward one end of the image 180 in the widthwise direction thereof. When accepting the above flick gesture through the touch panel 16B, the controller 10 determines that a slide gesture on the history button 181 in the widthwise direction of the image 180 has been accepted (YES in step S25) and reads out, from the HDD 18, combinations of setting values only for the function associated with the flicked history button 181 (step S28). In this case, the controller 10 reads out, from the HDD 18, combinations 50A, 50B, and 50C of setting values for the copy function.

After the processing in step S28, as shown in FIG. 23, the controller 10 generates an image 230 containing only history buttons 231, 232, and 233 showing the read combinations 50A, 50B, and 50C of setting values, respectively (step S29). The controller 10 generates the image 230 so that the history buttons 231, 232, and 233 are arranged along the longitudinal direction of the image 230 in chronological order according to the date of execution of jobs.

After the processing in step S29, as shown in FIG. 24, the controller 10 allows the display device 15 to display the image 230 in the second region 32 (step S30). In this case, because the size of the image 230 is smaller than that of the second region 32, the controller 10 allows the display device 15 to display the whole of the image 230 in the second region 32 as shown in FIG. 24.

After the processing in step S30, the controller 10 repeats processing resulting in a determination that no touch gesture has been accepted (NO in step S31) until any one of the history buttons 231, 232, and 233 is touched. The user touches the history button 232.

When accepting the touch gesture on the history button 232 through the touch panel 16B (YES in step S31), the controller 10 goes to the processing in step S27 and, in this step, allows the display device 15 to display a setting screen 110 for use in configuring the setting for the copy function associated with the history button 232, in a state where the setting screen 110 reflects the combination of setting values shown by the history button 232.

The user places an original document on the platen glass 7, confirms the setting screen 110, and then presses the Start key 16A. When detecting the pressing of the Start key 16A, the controller 10 allows, in accordance with the combination of setting values shown by the history button 232, the image reading device 11 to read the original document placed on the platen glass 7 to generate image data representing a document image, and then the image forming device 12 and so on to form the document image represented by the image data on a recording paper sheet P.

The controller 10 may go back to the processing in step S28 after the elapse of a predetermined time since the end of the image formation on the recording paper sheet P. In doing so, the controller 10 newly generates, in step S29, an image 230 in which a history button showing the combination of setting values for the most recently executed copy processing is prepended to the sequence of history buttons 231, 232, and 233 arranged in chronological order in the image 230 shown in FIG. 23 and, in step S30, allows the display device 15 to display the newly generated image 230 in the second region 32.

In the second embodiment, the controller 10 allows the display device 15 to display the first portion 71 of the scrollable menu image 40 in the first region 31, reads out, from the HDD 18, the combinations 50A, MA, 52A, and 53A of setting values satisfying the predetermined condition as combinations of setting values for the plurality of respective functions represented by the icons 41A to 41J contained in the scrollable menu image 40, allows the display device 15 to display respective history buttons 181, 182, 183, and 184 showing the combinations 50A, 51A, 52A, and 53A of setting values in a manner classified by function, and, upon acceptance of a touch gesture on the history button 183 through the touch panel 16B, allows the display device 15 to display the setting screen 210 for use in configuring the setting for the facsimile transmission function associated with the history button 183 in a state where the setting screen 210 reflects the combination of setting values shown by the history button 183. When accepting an instruction to execute a job through the operation device 16 while the above setting screen 210 is displayed, the controller 10 executes the job for the facsimile transmission function associated with the history button 183, in accordance with the combination of setting values shown by the history button 183. Alternatively, upon acceptance of a touch gesture on the history button 183 through the touch panel 16B, the controller 10 may execute the job for the facsimile transmission function associated with the history button 183, in accordance with the combination of setting values shown by the history button 183.

Since, as just described, respective combinations of setting values for each of the plurality of functions are displayed in a manner classified by function in the second region 32, the user can easily find out a desired combination of setting values, for example, as compared to the case where combinations of setting values for the plurality of functions are arranged in chronological order regardless of function. Therefore, it is possible to save the user's time and effort required to find out a desired combination of setting values.

In the second embodiment, the controller 10 reads out, from the HDD 18, combinations of setting values, only one combination for each of the plurality of functions and allows the display device 15 to display, in the second region 32, history buttons showing the read combinations of setting values, only one history button for each of the plurality of functions.

Since, as just described, only one combination of setting values for each of the plurality of functions is displayed in the second region 32, combinations of setting values for a larger number of functions are displayed in the second region 32 as compared to the case where a plurality of combinations of setting values are displayed for each of a plurality of functions. Therefore, the user can more easily find out a combination of setting values for a desired function.

Furthermore, in the second embodiment, the controller 10 reads out, from the HDD 18, respective combinations of setting values for respective jobs most recently executed in relation to each of the plurality of functions. Thus, combinations of setting values highly likely to be desired by the user are displayed in the second region 32, which further increases the user-friendliness.

Moreover, in the second embodiment, when accepting a slide gesture on the history button 181 through the touch panel 16B, the controller 10 reads out, from the HDD 18, the combinations 50A, 50B, and 50C of setting values for the function associated with the slid history button 181 and allows the display device 15 to display the history buttons 231, 232, and 233 showing the read combinations 50A, 50B, and 50C of setting values, respectively, in the second region 32.

Thus, the user can confirm all of combinations of setting values for a desired function with a simple operation that involves a slide gesture on the history button 181. Therefore, the user-friendliness can be further increased.

Modification of Second Embodiment

Although in the second embodiment the controller 10 allows the display device 15 to display, for each of the plurality of functions, only one history button showing a combination of setting values for the function in the second region 32, the present disclosure is not limited to the manner described in the above embodiment. For example, the controller 10 may read out, from the HDD 18, all of combinations of setting values for the plurality of functions and allow the display device 15 to display, in the second region 32, respective history buttons showing the read combinations of setting values in a manner classified by function.

Although in the second embodiment the controller 10 reads out, from the HDD 18, respective combinations of setting values for respective jobs most recently executed in relation to each of the plurality of functions, the present disclosure is not limited to the manner described in the above embodiment. For example, the controller 10 may read out, from the HDD 18, respective combinations of setting values most frequently used in relation to each of the plurality of functions.

Although in the second embodiment the controller 10 generates, as an image containing history buttons, an image 180 scrollable within the second region 32 in the longitudinal direction thereof, the present disclosure is not limited to the manner described in the above embodiment. The controller 10 may generate an image scrollable within the second region 32 in the widthwise direction thereof. FIG. 25 is a view showing still another example of an image containing history buttons. For example, as shown in FIG. 25, the controller 10 generates, as an image scrollable within the second region 32 in the widthwise direction thereof, an image 250 containing history buttons 251, 252, 253, and 254 showing combinations 50A, MA, 52A, and 53A of setting values, respectively. In this case, because the size of the image 250 in the longitudinal direction thereof is greater than the size of the second region 32 in the widthwise direction thereof, the controller 10 cannot allow the display device 15 to display the whole of the image 250 in the second region 32 at a time.

Therefore, as shown in FIG. 26, the controller 10 allows the display device 15 to display, as a portion of the image 250, a portion containing a predetermined number of (one in this case) history buttons 251 in the second region 32. When accepting a slide gesture on the second region 32 in the widthwise direction through the touch panel 16B, the controller 10 allows the display device 15 to scroll the image 250 in the widthwise direction of the second region 32 and allows the display device 15 to display one of the other history buttons 252, 253, and 254 in the second region 32.

On the other hand, as shown in FIG. 26, when accepting a slide gesture on the displayed history button 251, 252, 253 or 254 in the widthwise direction of the image 250 through the touch panel 16B, the controller 10 reads out, from the HDD 18, combinations of setting values only for the function associated with the slid history button, generates an image in which history buttons showing the read combinations of setting values are contained and arranged in chronological order, and allows the display device 15 to display the generated image in the second region 32.

Other Modifications

Although in the above embodiments the image forming device 12 and so on form an image on a recording paper sheet P, the present disclosure is not limited to the manner described in the above embodiments. The image forming device 12 and so on may form an image on recording media other than a recording paper sheet. An example of the other recording media is an OHP (overhead projector) sheet.

The present disclosure is not limited to the structure of the above embodiments and can be modified in various ways. For example, although in the above embodiments a multi-color multifunction peripheral is used as the image forming apparatus 1, it is merely illustrative and any other image forming apparatuses, such as a black-and-white multifunction peripheral, a copier, and a facsimile machine, may be used.

The structures, configurations, and processing described in the above embodiments with reference to FIGS. 1 to 26 are merely illustrative and are not intended to limit the present disclosure to them.

While the present disclosure has been described in detail with reference to the embodiments thereof, it would be apparent to those skilled in the art the various changes and modifications may be made therein within the scope defined by the appended claims.

What is claimed is:
1. An information processing apparatus comprising:
a display device including a display area;
an operation device that includes a touch panel provided on the display device and accepts an instruction from a user;
a storage device that stores combinations of setting values set in respective jobs previously executed in relation to each of a plurality of predetermined functions; and
a control device that includes a processor and functions, through the processor executing the control program, as a controller that allows the display device to display at least one of first images representing each of the plurality of functions in a predetermined first region of the display area, reads out a combination of setting values satisfying a predetermined condition from the storage device, allows the display device to display a second image showing the read combination of setting values in a predetermined second region of the display area different from the first region, and upon acceptance of a touch gesture on the second image through the touch panel, the controller executes, in accordance with the combination of setting values shown by the second image on which the touch gesture has been made, a job related to the function associated with the second image, wherein the controller allows the display device to display a first portion, which containing two or more first images, of a scrollable menu image containing all the first images in the first region, reads out, from the storage device, first combinations of setting values for the functions represented by each of the two or more first images contained in only the first portion, allows the display device to display only the second images showing each of the first combinations in the second region on the same screen, wherein, when accepting a slide gesture on the scrollable menu image through the touch panel, the controller allows the display device to scroll the scrollable menu image within the first region and display, upon completion of the scrolling of the scrollable menu image, a second portion, which containing two or more other first images, of the scrollable menu image in the first region, reads out, from the storage device, second combinations of setting values for the functions represented by each of the two or more other first images contained in only the second portion, and allows the display device to display only the second images showing each of the second combinations in the second region on the same screen.

2. The information processing apparatus according to claim 1, wherein when accepting the touch gesture on the second image through the touch panel, the controller allows the display device to display a setting screen for use in configuring settings of the function associated with the second image on which the touch gesture has been made, in a state where the setting screen reflects the combination of setting values shown by the second image, and when accepting an instruction to execute a job through the operation device while the setting screen is displayed, the controller executes the job related to the function associated with the second image, in accordance with the combination of setting values shown by the second image.

3. The information processing apparatus according to claim 2, wherein the controller reads out, from the storage device, the combination of setting values for the function associated with the second image on which the touch gesture has been made, and the controller allows the display device to display the second image showing the read combination of setting values in a predetermined region of the setting screen.

4. The information processing apparatus according to claim 1, wherein the controller allows the display device to scroll in the second region an image containing only the second images showing each of the first combinations until the completion of the scrolling of the scrollable menu image.

5. The information processing apparatus according to claim 1, wherein the controller allows the display device to display in the second region only the second images showing each of the second combinations on the same screen after elapse of a predetermined first time since the completion of the scrolling of the scrollable menu image.

6. The information processing apparatus according to claim 5, wherein when the controller accepts a touch gesture on one of the second images showing each of the first combinations before the elapse of the first time and the touch gesture is continued for a predetermined second time or more, the controller allows the display device to display the first portion in the first region, and when the controller accepts a touch gesture on one of the second images showing each of the first combinations before the elapse of the first time and the touch gesture is continued for less than the second time, the controller executes a job related to the function associated with the second image on which the touch gesture has been made, in accordance with the combination of setting values shown by the second image.

7. The information processing apparatus according to claim 5, wherein the controller:

generates an image which extending in the widthwise direction of the second region and containing only the second images showing each of the first combinations or the second combinations, and allows the display device to display a portion of the generated image in the second regio n;

allows, when accepting a slide gesture on the generated image in the widthwise direction of the second region through the touch panel, the display device to scroll the generated image in t he widthwise direction of the second region; and reads out, when accepting a slide gesture on any one of the second images contained in the generated image in the longitudinal direction of the second region through the touch panel, from the storage device, the combinations of setting values only for the function associated with the second image on which the slide gesture has been made, and allows the display device to display, in the second region, only the second images showing each of the read combinations of setting values.

* * * * *